US011482732B2

(12) United States Patent
Siegel et al.

(10) Patent No.: US 11,482,732 B2
(45) Date of Patent: Oct. 25, 2022

(54) SYSTEMS AND METHODS FOR IMPROVED SOLID-STATE ELECTROLYTES

(71) Applicant: The Regents of The University of Michigan, Ann Arbor, MI (US)

(72) Inventors: Donald J. Siegel, Ann Arbor, MI (US); Kwangnam Kim, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 363 days.

(21) Appl. No.: 16/585,185

(22) Filed: Sep. 27, 2019

(65) Prior Publication Data

US 2020/0106122 A1   Apr. 2, 2020

Related U.S. Application Data

(60) Provisional application No. 62/738,385, filed on Sep. 28, 2018.

(51) Int. Cl.
 *H01M 10/058* (2010.01)
 *H01M 10/0562* (2010.01)
 (Continued)

(52) U.S. Cl.
 CPC .......... *H01M 10/058* (2013.01); *C01D 15/02* (2013.01); *C01D 15/04* (2013.01);
 (Continued)

(58) Field of Classification Search
 CPC ........... H01M 10/058; H01M 10/0562; H01M 2300/0065; H01M 2300/0068
 See application file for complete search history.

(56) References Cited

U.S. PATENT DOCUMENTS

2013/0202971 A1   8/2013   Zhao et al.
2015/0364787 A1  12/2015   Zhang et al.
(Continued)

OTHER PUBLICATIONS

Aidhy et al., First-Principles Prediction of Phase Stability and Crystal Structures in Li—Zn and Na—Zn Mixed-Metal Borohydrides, Physical Review B, 2011, 83(14):144111, 8 pages.
(Continued)

*Primary Examiner* — Amanda C. Walke
(74) *Attorney, Agent, or Firm* — Quarles & Brady LLP

(57) ABSTRACT

Disclosed are system and methods for manufacturing a solid-state electrolyte to be used in an electrochemical cell. The method can include forming a solid-state electrolyte from a material having a compositional property and a structural property, the material having been selected by: (i) providing material properties of a material, wherein the material properties comprise both compositional and structural information; (ii) calculating a first distortion parameter of a material, wherein the first distortion parameter represents the degree of lattice distortion of the material; (iii) determining an estimated ionic mobility value of the material using the one or more distortion parameters; (iv) varying the provided material properties using isovalent substitution and determining a second ionic mobility value from a second distortion parameter by repeating steps (i)-(iii); and (v) comparing the first and second ionic mobility values to select the superior material derivative.

26 Claims, 24 Drawing Sheets
(15 of 24 Drawing Sheet(s) Filed in Color)

(51) Int. Cl.
   *C01D 15/04* (2006.01)
   *C01D 15/02* (2006.01)
(52) U.S. Cl.
   CPC ..... *H01M 10/0562* (2013.01); *C01P 2002/30* (2013.01); *C01P 2004/38* (2013.01); *C01P 2004/41* (2013.01); *H01M 2300/0068* (2013.01)

(56) References Cited

U.S. PATENT DOCUMENTS

| | | | |
|---|---|---|---|
| 2017/0139013 A1 | 5/2017 | Richards et al. | |
| 2017/0275172 A1 | 9/2017 | Zhao et al. | |
| 2019/0006672 A1* | 1/2019 | Yushin | C01D 15/00 |

OTHER PUBLICATIONS

Albertus et al., Status and Challenges in Enabling the Lithium Metal Electrode for High-Energy and Low-Cost Rechargeable Batteries, Nature Energy, 2018, 3(1):16-21.

Alonson et al., Preparation and Topotactical Oxidation of ScVO 3 with Bixbyte Structure: a Low-Temperature Route to Stabilize the New Defect Fluorite ScVO 3.5 Metastable Phase, Dalton Transactions, 2004, 9:1294-1297.

Angell et al., Relaxation in Glassforming Liquids and Amorphous Solids, Journal of Applied Physics, 2000, 88(6): 3113-3157.

Armiento et al., High-Throughput Screening of Perovskite Alloys for Piezoelectric Performance and Thermodynamic Stability, Physical Review B, 2014, 89(13):134103, 9 pages.

Aryasetiawan et al., The GW Method, Reports on Progress in Physics, 1998, 161(3):237, 73 pages.

Awaka et al., Synthesis and Structure Analysis of Tetragonal Li7La3Zr2O12 with the Garnet-Related Type Structure, Journal of Solid State Chemistry, 2009, 182(8):2046-2052.

Bachman et al., Inorganic Solid-State Electrolytes for Lithium Batteries: Mechanisms and Properties Governing Ion Conduction, Chemical Reviews, 2016, 116(1):140-162.

Blochl, Projector Augmented-Wave Method, Physical Review B, 1994, 50(24):17953-17979.

Braga et al., Glass-Amorphous Alkali-Ion Solid Electrolytes and Their Performance in Symmetrical Cells, Energy & Environmental Science, 2016, 9(3):948-954.

Breard et al., Investigation of Bixbyite Type Scandium Oxides Involving a Magnetic Cation: Sc2—xFexO3 ($0 \leq x \leq 1$), Solid State Communications, 2011, 151(3):223-226.

Canepa et al., High Magnesium Mobility in Ternary Spinel Chalcogenides, Nature Communications, 2017, 8(1):1-8.

Chen et al., Anharmonicity and Phase Stability of Antiperovskite Li3OCl, Physical Review B, 2015, 91(21):214306, 8 pages.

Deiseroth et al., Li6PS5X: A Class of Crystalline Li-Rich Solids with an Unusually High Li+ Mobility, Angewandte Chemie Int Ed, 2008, 47(4):755-758.

Deng et al., Rational Composition Optimization of the Lithium-Rich Li3OCl1-x Br x Anti-Perovskite Superionic Conductors, Chemistry of Materials, 2015, 27(10):3749-3755.

Deng et al., Elastic Properties of Alkali Superionic Conductor Electrolytes from First Principles Calculations, Journal of the Electrochemical Society, 2016, 163(2):A67-A74.

Dietrich et al., Lithium Ion Conductivity in Li2S—P2S5 Glasses—Building Units and Local Structure Evolution During the Crystallization of Superionic Conductors Li3PS4, Li7P3S11 and Li4P2S7, Journal of Materials Chemistry A, 2017, 5(34):18111-18119.

Duvel et al., Is Geometric Frustration-Induced Disorder a Recipe for High Ionic Conductivity?, Journal of the American Chemical Society, 2017, 139(1):5842-5848.

Emly et al., Phase Stability and Transport Mechanisms in Antiperovskite Li3OCl and Li3OBr Superionic Conductors, Chemistry of Materials, 2013, 25(23):4663-4670.

Fan et al., Experimental Study of MgB2 Decomposition, Applied Physics Letters, 2001, 79(1):87-89.

Fang et al., Superhalogen-Based Lithium Superionic Conductors, Journal of Materials Chemistry A, 2017, 5(26):13373-13381.

Fuchs et al., Quasiparticle Band Structure Based on a Generalized Kohn-Sham Scheme, Physical Review B, 2007, 76(11):115109, 8 pages.

Goldschmidt et al., Die Gesetze Der Krystallochemie, Naturwissenschaften, 1926, 14(21):477-485.

Goodenough et al., Challenges for Rechargeable Li Batteries, Chemistry of Materials, 2010, 22(3):587-603.

Goodenough et al., Solid Electrolytes in Rechargeable Electrochemical Cells, Journal of the Electrochemical Society, 2015, 162(14):A2387-A2392.

Hautier et al., Phosphates as Lithium-Ion Battery Cathodes: An Evaluation Based on High-Throughput ab Initio Calculations, Chemistry of Materials, 2011, 23(15):3495-3508.

Hautier et al., Accuracy of Density Functional Theory in Predicting Formation Energies of Ternary Oxides from Binary Oxides and its Implication on Phase Stability, Physical Review B, 2012, 85(15):155208, 18 pages.

He et al., Origin of Fast Ion Diffusion in Super-Ionic Conductors, Nature Communications, 2017, 8:15893, 7 pages.

Henkelman et al., Improved Tangent Estimate in the Nudged Elastic Band Method for Finding Minimum Energy Paths and Saddle Points, Journal of Chemical Physics, 2000, 113(22):9978-9985.

Heyd et al., Hybrid Functionals Based on a Screened Coulomb Potential, Journal of Chemical Physics, 2003, 118(18):8207-8215.

Hines, Atomistic Simulation and Ab Initio Studies of Polar Solids, PhD Diss., University of Bristol, 1997, 271 pages.

Hood et al., Li2OHCl Crystalline Electrolyte for Stable Metallic Lithium Anodes, Journal of the American Chemical Society, 2016, 138(6):1768-1771.

Hu, Batteries: Getting Solid, Nature Energy, 2016, vol. 1, Article No. 16042, pp. 1-2.

Kamaya et al., A Lithium Superionic Conductor, Nature Materials, 2011, 10(9):682-686.

Kato et al., High-Power All-Solid-State Batteries Using Sulfide Superionic Conductors, Nature Energy, 2016, 1(4):1-7.

Kozinsky et al., Effects of Sublattice Symmetry and Frustration on Ionic Transport in Garnet Solid Electrolytes, Physical Review Letters, 2016, 116(5):055901, 5 pages.

Kraft et al., Influence of Lattice Polarizability on the Ionic Conductivity in the Lithium Superionic Argyrodites Li6PS5X (X=Cl, Br, I), Journal of the American Chemical Society, 2017, 139(31):10909-10918.

Kresse et al., Efficient Iterative Schemes for Ab Initio Total-Energy Calculations Using a Plane-Wave Basis Set, Physical Review B, 1996, 54(16):11169-11186.

Kresse et al., From Ultrasoft Pseudopotentials to the Projector Augmented-Wave Method, Physical Review B, 1999, 59(3):1758-1775.

Kreuer, On the Development of Proton Conducting Materials for Technological Applications, Solid State Ionics, 1997, 97(1-4):1-15.

Krukau et al., Influence of the Exchange Screening Parameter on the Performance of Screened Hybrid Functionals, Journal of Chemical Physics, 2006, 125(22):224106, 5 pages.

Kweon et al., Structural, Chemical, and Dynamical Frustration: Origins of Superionic Conductivity in Closo-Borate Solid Electrolytes, Chemistry of Materials, 2017, 29(21):9142-9153.

Lee et al., Unlocking the Potential of Cation-Disordered Oxides for Rechargeable Lithium Batteries, Science, 2014, 343(6170):519-522.

Levy et al., Disorder Processes in A3+B3+O3 Compounds: Implications for Radiation Tolerance, Philosophical Magazine, 2004, 84(6):533-545.

Levy, Crystal Structure and Defect Property Predictions in Ceramic Materials, PhD Dissertation, University of London, 2005, 242 pages.

Li et al., Fluorine-Doped Antiperovskite Electrolyte for All-Solid-State Lithium-Ion Batteries, Angewandte Chemie International Edition, 2016, 55(34):9965-9968.

(56) References Cited

OTHER PUBLICATIONS

Li et al., Reaction Mechanism Studies Towards Effective Fabrication of Lithium-Rich Anti-Perovskites Li3OX (X=Cl, Br), Solid State Ionics, 2016, 284:14-19.
Liu et al., Enhancing Ionic Conductivity in Composite Polymer Electrolytes with Well-Aligned Ceramic Nanowires, Nature Energy, 2017, 2(5):1-7.
Lorenz et al., Precise Determination of the Bond Percolation Thresholds and Finite-Size Scaling Corrections for the s.c., f.c.c., and b.c.c. Lattices, Physical Review E, 1998, 57(1):230, 25 pages.
Lu et al., Li-Rich Anti-Perovskite Li3OCl Films with Enhanced Ionic Conductivity, Chemical Communications, 2014, 50(78):11520-11522.
Lu et al., Defect Chemistry and Lithium Transport in Li3OCl Anti-Perovskite Superionic Conductors, Physical Chemistry Chemical Physics, 2015, 17(48):32547-32555.
Lu et al., Antiperovskite Li3OCl Superionic Conductor Films for Solid-State Li-Ion Batteries, Advanced Science, 2016, 3(3):1500359, 5 pages.
Lufaso, Perovskite Synthesis and Analysis Using Structure Prediction Diagnostic Software, Ph.D. Dissertation, The Ohio State University, 2002, 285 pages.
Monroe et al., The Impact of Elastic Deformation on Deposition Kinetics at Lithium/Polymer Interfaces, Journal of the Electrochemical Society, 2005, 152(2):A396-A404.
Mouta et al., Concentration of Charge Carriers, Migration, and Stability in Li3OCl Solid Electrolytes, Chemistry of Materials, 2014, 26(24):7137-7144.
Mouta et al., Li+ Interstitials as the Charge Carriers in Superionic Lithium-Rich Anti-Perovskites, Journal of Materials Chemistry A, 2016, 4(5):1586-1590.
Munoz et al., Evolution of the Magnetic Structure of Hexagonal HoMnO3 from Neutron Powder Diffraction Data, Chemistry of Materials, 2001, 13(5):1497-1505.
Murnaghan, The Compressibility of Media Under Extreme Pressures, Proceedings of the National Academy of Sciences of the United States of America, 1944, 30(9):244-247.
Murugan et al., Fast Lithium Ion Conduction in Garnet-Type Li7La3Zr2O12, Angewandte Chemie International Edition, 2007, 46(41):7778-7781.
Nagabhushana et al., Direct Calorimetric Verification of Thermodynamic Instability of Lead Halide Hybrid Perovskites, Proceedings of the National Academy of Sciences, 2016, 113(28):7717-7721.
Nguyen et al., Experimental and Computational Evaluation of a Sodium-Rich Anti-Perovskite for Solid State Electrolytes, Journal of the Electrochemical Society, 2016, 163(10):A2165-A2171.
Ong et al., Phase Stability, Electrochemical Stability and Ionic Conductivity of the Li10±1MP2X12 (M=Ge, Si, Sn, Al or P, and X=O, S or Se) Family of Superionic Conductors, Energy & Environmental Science, 2012, 6(1):148-156.
Perdew et al., Generalized Gradient Approximation Made Simple, Physical Review Letters, 1996, 77(18):3865-3868.
Rayavarapu et al., Variation in Structure and Li+-ion Migration in Argyrodite-type Li6PS5X(X=Cl,Br,I) Solid Electrolytes, Journal of Solid State Electrochemistry, 2012, 16(5):1807-1813.
Richards et al., Design of Li1+2xZn1−xPS4, A New Lithium Ion Conductor, Energy & Environmental Science, 2016, 9(10):3272-3278.
Richards et al., Design and Synthesis of the Superionic Conductor Na10SnP2S12, Nature Communications, 2016, 7:11009, pp. 1-8.
Rong et al., Materials Design Rules for Multivalent Ion Mobility in Intercalation Structures, Chemistry of Materials, 2015, 27(17):6016-6021.
Roth et al., How Electrolytes Influence Battery Safety, Electrochemical Society Interface, 2012, 21(2):45-49.
Schirmacher, Theory of Diffusion and Ionic Conduction in Glass, Solid State Ionics, 1988, 28:129-133.
Schmidt et al., Predicting the Thermodynamic Stability of Solids Combining Density Functional Theory and Machine Learning, Chemistry of Materials, 2017, 29(12):5090-5103.
Sendek et al., Holistic Computational Structure Screening of More Than 12000 Candidates for Solid Lithium-Ion Conductor Materials, Energy & Environmental Science, 2017, 10(1):306-320.
Shannon, Revised Effective Ionic Radii and Systematic Studies of Interatomic Distances in Halides and Chalcogenides, Acta Crystallographica, 1976, 32(5):751-767.
Shishkin et al., Implementation and Performance of the Frequency-Dependent GW Method Within the PAW Framework, Physical Review B, 2006, 74(3):035101, 13 pages.
Shishkin et al., Self-Consistent GW Calculations for Semiconductors and Insulators, Physical Review B, 2007, 75(23):235102, 9 pages.
Thangadurai et al., Crystal Structure Revision and Identification of Li+-Ion Migration Pathways in the Garnet-Like Li5La3M2O12 (M=Nb, Ta) Oxides, Chemistry of Materials, 2004, 16(16):2998-3006.
Thompson et al., Electrochemical Window of the Li-Ion Solid Electrolyte Li7La3Zr2O12, ACS Energy Letters, 2017, 2(2):462-468.
Tian et al., Enhanced Charge Transport in Amorphous Li2O2, Chemistry of Materials, 2014, 26(9):2952-2959.
Van De Walle et al., The Effect of Lattice Vibrations on Substitutional Alloy Thermodynamics, Reviews of Modern Physics, 2002, 74(1):11-45.
Wang et al., Structural Manipulation Approaches Towards Enhanced Sodium Ionic Conductivity in Na-Rich Antiperovskites, Journal of Power Sources, 2015, 293:735-740.
Wang et al., P2-Na0.6[Cr0.6Ti .4]O2 Cation-Disordered Electrode for High-Rate Symmetric Rechargeable Sodium-Ion Batteries, Nature Communications, 2015, 6(1):1-9.
Wang et al., Design Principles for Solid-State Lithium Superionic Conductors, Nature Materials, 2015, 14(10):1026-1031.
Wang et al., From Anti-Perovskite to Double Anti-Perovskite: Tuning Lattice Chemistry to Achieve Super-Fast Li+ Transport in Cubic Solid Lithium Halogen-Chalcogenides, Journal of Materials Chemistry A, 2018, 6(1):73-83.
Yashima et al., Structural Phase Transition and Octahedral Tilting in the Calcium Titanate Perovskite CaTiO3, Solid State Ionics, 2009, 180(2-3):120-126.
Yokokawa et al., Thermodynamic Stabilities of Perovskite Oxides for Electrodes and Other Electrochemical Materials, Solid State Ionics, 1992, 52(1-3):43-56.
Yu et al., Elastic Properties of the Solid Electrolyte Li7La3Zr2O12 (LLZO), Chemistry of Materials, 2016, 28(1):197-206.
Zhang et al., Ab Initio Study of the Stabilities of and Mechanism of Superionic Transport in Lithium-Rich Antiperovskites, Physical Review B, 2013, 87(13):134303, 8 pages.
Zhang et al., High Pressure-High Temperature Synthesis of Lithium-Rich Li3O (Cl, Br) and Li3-xCax/2OCl Anti-Perovskite Halides, Inorganic Chemistry Communications, 2014, 48:140-143.
Zhao et al., Superionic Conductivity in Lithium-Rich Anti-Perovskites, Journal of the American Chemical Society, 2012, 134(36):15042-15047.
Zhu et al., Enhanced Ionic Conductivity with Li7O2Br3 Phase in Li3OBr Anti-Perovskite Solid Electrolyte, Applied Physics Letters, 2016, 109(10):101904, 5 pages.

* cited by examiner

| Li-based Compounds | t (Group) | Vacancy | Interstitial dumbbell | Na-based Compounds | t (Group) | Vacancy | Interstitial dumbbell |
|---|---|---|---|---|---|---|---|
| Li₂OF | 0.68 (3) | 139 (165) | 24 (23) | Na₂OF | 0.69 (3) | 201 (128) | 50 (30) |
| Li₂OCl | 0.84 (1) | 325 | 138 | Na₂OCl | 0.83 (1) | 240 | 101 |
| Li₂OBr | 0.89 (1) | 370 | 167 | Na₂OBr | 0.87 (1) | 353 | 125 |
| Li₂OI | 0.97 (1) | 397 | 225 | Na₂OI | 0.94 (1) | 428 | 165 |
| Li₂SF | 0.88 (2) | 109 (101) | 68 (65) | Na₂SF | 0.86 (2) | 166 (159) | 79 (75) |
| Li₂SCl | 0.70 (3) | 115 (137) | 34 (39) | Na₂SCl | 0.70 (3) | 112 (127) | 36 (37) |
| Li₂SBr | 0.74 (3) | 191 (196) | 64 (66) | Na₂SBr | 0.74 (3) | 184 (186) | 52 (54) |
| Li₂SI | 0.81 (2) | 270 (270) | 114 (109) | Na₂SI | 0.80 (2) | 270 (256) | 99 (98) |
| Li₂SeF | 0.93 (1) | 138 | 68 | Na₂SeF | 0.90 (1) | 203 | 76 |
| Li₂SeCl | 0.66 (3) | 100 (82) | 48 (39) | Na₂SeCl | 0.67 (3) | 95 (91) | 68 (45) |
| Li₂SeBr | 0.70 (3) | 123 (134) | 42 (46) | Na₂SeBr | 0.70 (3) | 111 (130) | 30 (30) |
| Li₂SeI | 0.76 (2) | 201 (208) | 70 (71) | Na₂SeI | 0.76 (2) | 205 (198) | 72 (74) |

FIG. 7

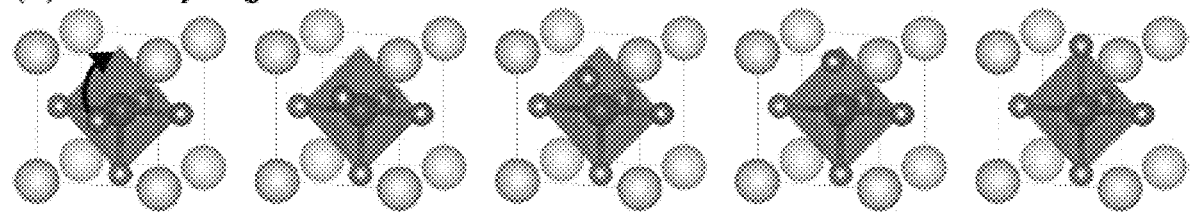
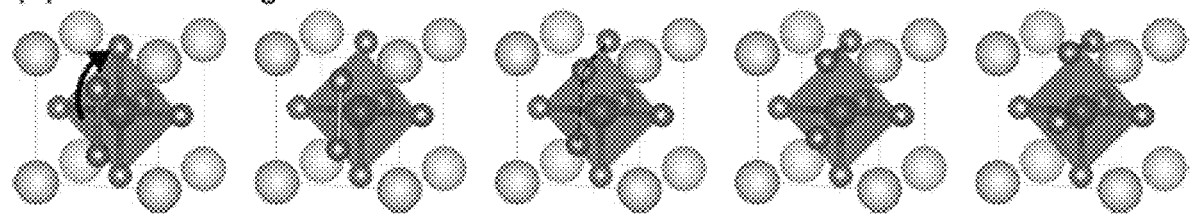
FIG. 11

FIG. 12

| Compound | Symmetry | a (Å) | b (Å) | c (Å) | α (°) | β (°) | γ (°) |
|---|---|---|---|---|---|---|---|
| Li₃OF | Quasi-orthorhombic | 5.038 | 5.112 | 7.178 | 89.999 | 89.999 | 89.999 |
| Li₃OCl | Cubic (Pm-3m) | 3.900 (3.91) | | | | | |
| Li₃OBr | Cubic (Pm-3m) | 3.989 (4.02) | | | | | |
| Li₃OI | Cubic (Pm-3m) | 4.161 | | | | | |
| Li₃SF | Quasi-orthorhombic | 5.571 | 5.527 | 7.849 | 89.998 | 90.000 | 89.992 |
| Li₃SCl | Quasi-orthorhombic | 6.276 | 6.321 | 8.922 | 89.994 | 90.008 | 89.991 |
| Li₃SBr | Quasi-orthorhombic | 6.440 | 6.499 | 9.191 | 89.998 | 90.004 | 90.010 |
| Li₃SI | Quasi-orthorhombic | 6.689 | 6.684 | 9.458 | 90.000 | 90.000 | 90.000 |
| Li₃SeF | Cubic (Pm-3m) | 4.011 | | | | | |
| Li₃SeCl | Quasi-orthorhombic | 6.453 | 6.485 | 9.160 | 90.000 | 89.998 | 90.004 |
| Li₃SeBr | Quasi-orthorhombic | 6.651 | 6.677 | 9.464 | 89.999 | 90.014 | 90.000 |
| Li₃SeI | Quasi-orthorhombic | 6.908 | 6.906 | 9.781 | 89.998 | 90.000 | 90.001 |
| Na₃OF | Quasi-orthorhombic | 5.844 | 6.044 | 8.286 | 89.999 | 89.999 | 89.999 |
| Na₃OCl | Cubic (Pm-3m) | 4.540 (4.491) | | | | | |
| Na₃OBr | Cubic (Pm-3m) | 4.618 (4.564) | | | | | |
| Na₃OI | Cubic (Pm-3m) | 4.746 (4.707) | | | | | |
| Na₃SF | Quasi-orthorhombic | 6.312 | 6.269 | 8.918 | 89.998 | 90.002 | 90.001 |
| Na₃SCl | Quasi-orthorhombic | 7.045 | 7.157 | 10.013 | 90.003 | 89.999 | 89.995 |
| Na₃SBr | Quasi-orthorhombic | 7.190 | 7.345 | 10.264 | 90.024 | 90.067 | 89.993 |
| Na₃SI | Quasi-orthorhombic | 7.442 | 7.492 | 10.548 | 90.000 | 90.000 | 90.000 |
| Na₃SeF | Cubic (Pm-3m) | 4.509 | | | | | |
| Na₃SeCl | Quasi-orthorhombic | 7.180 | 7.342 | 10.379 | 90.008 | 89.998 | 89.998 |
| Na₃SeBr | Quasi-orthorhombic | 7.414 | 7.510 | 10.525 | 90.007 | 90.004 | 90.009 |
| Na₃SeI | Quasi-orthorhombic | 7.625 | 7.744 | 10.852 | 90.000 | 90.000 | 90.000 |

FIG. 13

| Li-based Compound | Bulk modulus (GPa) | Band gap (eV) | |
|---|---|---|---|
| | | GW@HSE06 | GW@GGA |
| Li$_3$OF | 59.7 | 8.64 | 8.37 |
| Li$_3$OCl | 52.9 (55.7) | 8.07 | 7.89 |
| Li$_3$OBr | 48.6 (52.3) | 7.30 | 7.10 |
| Li$_3$OI | 43.4 | 6.38 | 6.21 |
| Li$_3$SF | 43.2 | 7.08 | 6.86 |
| Li$_3$SCl | 29.7 | 6.75 | 6.58 |
| Li$_3$SBr | 28.8 | 6.36 | 6.18 |
| Li$_3$SI | 27.7 | 5.67 | 5.52 |
| Li$_3$SeF | 47.5 | 6.08 | 5.87 |
| Li$_3$SeCl | 25.4 | 5.93 | 5.78 |
| Li$_3$SeBr | 24.7 | 5.75 | 5.59 |
| Li$_3$SeI | 24.0 | 5.42 | 5.28 |

| Na-based Compound | Bulk modulus (GPa) | Band gap (eV) | |
|---|---|---|---|
| | | GW@HSE06 | GW@GGA |
| Na$_3$OF | 36.8 | 4.92 | 4.66 |
| Na$_3$OCl | 32.4 (36.4) | 5.08 | 4.94 |
| Na$_3$OBr | 31.2 (34.0) | 4.64 | 4.47 |
| Na$_3$OI | 28.9 | 4.41 | 4.31 |
| Na$_3$SF | 31.8 | 5.16 | 5.06 |
| Na$_3$SCl | 21.6 | 4.98 | 4.89 |
| Na$_3$SBr | 21.0 | 4.84 | 4.72 |
| Na$_3$SI | 20.0 | 4.74 | 4.65 |
| Na$_3$SeF | 34.2 | 4.59 | 4.52 |
| Na$_3$SeCl | 18.3 | 4.43 | 4.35 |
| Na$_3$SeBr | 18.3 | 4.42 | 4.33 |
| Na$_3$SeI | 17.6 | 4.39 | 4.31 |

FIG. 14

(a) Pnma prototype (Before relaxation)
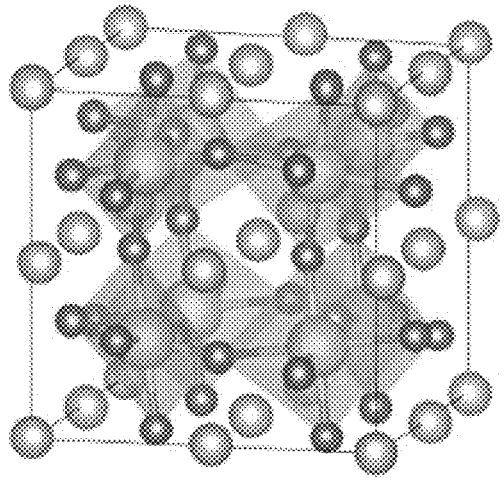
Li$_3$SF
($t$ = 0.57)
(b) F-centered structure (After relaxation)
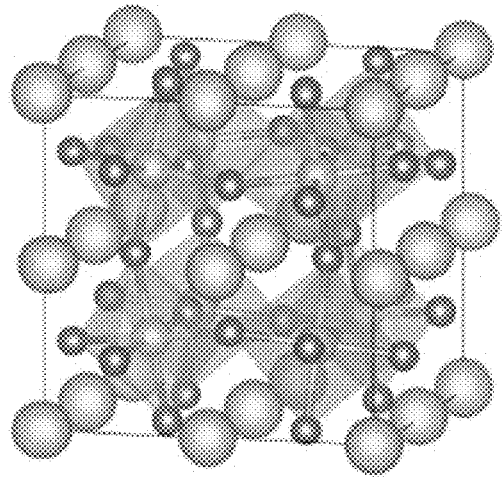
Li$_3$SF
($t$ = 0.88)
FIG. 15

| Li-based Compounds | $E_d$ (meV/atom) | Na-based Compounds | $E_d$ (meV/atom) |
|---|---|---|---|
| Li$_3$OF | 55.1 | Na$_3$OF | 55.6 |
| Li$_3$OCl | 11.1 (13.9) | Na$_3$OCl | 0.2 |
| Li$_3$OBr | 21.9 (25.8) | Na$_3$OBr | -23.9 |
| Li$_3$OI | 87.8 | Na$_3$OI | -18.7 |
| Li$_3$SF | 67.6 | Na$_3$SF | 44.9 |
| Li$_3$SCl | 67.7 | Na$_3$SCl | 63.6 |
| Li$_3$SBr | 58.7 | Na$_3$SBr | 49.7 |
| Li$_3$SI | 44.1 | Na$_3$SI | 27.1 |
| Li$_3$SeF | 57.5 | Na$_3$SeF | 28.9 |
| Li$_3$SeCl | 73.1 | Na$_3$SeCl | 68.9 |
| Li$_3$SeBr | 64.3 | Na$_3$SeBr | 60.2 |
| Li$_3$SeI | 51.6 | Na$_3$SeI | 41.4 |

FIG. 20

SYSTEMS AND METHODS FOR IMPROVED SOLID-STATE ELECTROLYTES

CROSS-REFERENCES TO RELATED APPLICATIONS

This application claims priority to U.S. Patent Application No. 62/738,385 filed Sep. 28, 2018.

STATEMENT REGARDING FEDERALLY SPONSORED RESEARCH

This invention was made with government support under DE-AC02-06CH11357 awarded by the U.S. Dept. of Energy. The government has certain rights in the invention.

FIELD OF THE INVENTION

This invention relates to electrochemical devices, such as lithium ion conducting solid-state electrolytes, and solid-state lithium ion batteries including these solid-state electrolytes.

BACKGROUND

Li-ion batteries are widely used in portable devices due to their higher energy densities relative to competing battery chemistries. Nevertheless, additional improvements in the performance of Li-ion batteries are being driven by emerging applications such as electric vehicles, which place greater demands upon the performance of the energy storage system. Enhanced safety is one of the most sought-after performance improvements. Safety limitations in Li-ion batteries can originate from the use of liquid electrolytes. These electrolytes have high ionic conductivity, yet are volatile and flammable; moreover, they are amenable to dendrite formation, resulting in internal short-circuiting. In principle, the use of a solid electrolyte (SE) can circumvent these problems. Furthermore, SEs present the possibility of using metallic Li as the anode, in place of intercalated carbon. This substitution is projected to significantly increase energy density.

Historically, the ionic conductivity of solids has been insufficient to supplant liquid electrolytes. Very recently, however, a small number of solids with ionic conductivities comparable to that of liquids have been identified ($Li_7La_3Zr_{20}O_{12}$, $Li_{10}GeP_2S_{12}$, etc.). The discovery of these fast ion conductors has advanced the prospects for realizing solid-state batteries. Nevertheless, additional study of these materials has, in essentially all cases, unearthed other shortcomings (stability, Li penetration, etc.), suggesting that the discovery of alternative SEs remains an important pursuit.

A fundamental problem in the identification of new SEs is determining what chemical/mechanical/structural features promote high ion mobility. Symmetry-lowering distortions of a solid's crystal structure are one such feature. These distortions include tilting/rotations of a crystal's polyhedral building blocks (octahedra, tetrahedra, etc.), variations in the length of the bonds that comprise these units, and a lowering of the crystalline (space group) symmetry, such as a distortion from cubic to orthorhombic symmetry. These distortions can be achieved in certain classes of compounds via composition variation. More generally, lattice distortions may be considered as a mild form of disorder. This connection is significant, as a link between ionic conductivity and the presence of disorder in SEs is beginning to emerge in the literature. In one instance, disorder manifests as a complete absence of crystallinity, i.e., an amorphous or glassy phase. Disorder in the occupation of a sublattice can also affect ionic conductivity. In $Li_7La_3Zr_2O_{12}$ (LLZO), disordering of vacancies on the Li-sublattice has shown a potential correlation with high ionic conductivity in the cubic polymorph. Vacancy ordering in the tetragonal phase lowers the conductivity by several orders of magnitude. Likewise, in $Ba_{1-x}Ca_xF_2$, geometric frustration achieved by doping $CaF_2$ with Ba induces disorder and excess volume that increases the ionic mobility. Finally, in closoboranes, enhanced ionic conductivity has been proposed to arise from a combination of irregular cation docking to $[B_{12}H_{12}]^{2-}$ anions and thermally-activated anion rotations. Although unrelated to solid electrolytes, cation disordering in cathodes has been correlated with higher capacities and enhanced ion transport.

The preceding examples illustrate the emerging connection between disorder and high ionic conductivity. Nevertheless, these systems represent isolated cases drawn from unrelated classes of compounds. As such, it is unclear whether one could exploit—or tune—the degree of disorder to further improve conductivity in these systems. A more desirable approach would be to tune disorder systematically within a family of related compounds. This could be achieved, for example, by varying composition or processing conditions. Such an approach would be of value in establishing the connection between mobility and disorder, assessing tradeoffs between disorder and stability, and provide a potential mechanism for engineering electrolyte properties.

SUMMARY OF THE INVENTION

The present disclosure provides systems and methods for improved solid-state electrolytes. The techniques described herein are aided by the discovery of a correlation between ionic mobility and lattice distortions. This previously unrecognized relationship can be exploited to evaluate the ability of a material to function as a solid-state electrolyte. Using this knowledge of the elementary chemical and structural features that control ionic conductivity, the degree of distortion in a material can be systematically tuned via isovalent composition variation to arrive at a suitable solid-state electrolyte material. These techniques have led to the discovery of a new electrolyte material, $Na_3SI$, which shows promise in future electrochemical applications.

In one aspect, the present disclosure provides a method of manufacturing a solid-state electrolyte to be used in an electrochemical cell. The method can comprise forming a solid-state electrolyte from a material having a compositional property and a structural property, the material having been selected by: (i) providing material properties of the material, wherein the material properties comprise both compositional and structural information; (ii) calculating a first distortion parameter of the material, wherein the first distortion parameter represents the degree of lattice distortion of the material; (iii) determining an estimated ionic mobility value of the material using the one or more distortion parameters; (iv) varying the provided material properties using isovalent substitution and determining a second ionic mobility value from a second distortion parameter by repeating steps (i)-(iii); and (v) comparing the first and second ionic mobility values to select the superior material derivative.

In this method, the material can be selected from the group consisting of anti-perovskite solid electrolytes. The material can have an anti-perovskite crystalline structure. The material can have the formula $X_3AB$ where: X is a mono-valent cation with an electrical charge of +1; A is an anion with an electrical charge of −2; and B is an anion with an electrical charge of −1. In the material, X can be selected from the group consisting of Li, Na, and K; A can be selected from the group consisting of O, S, and Se; and B can be selected from the group consisting of F, Cl, Br, and I. The one or more distortion parameters of a material can be calculated using atomic radii. The estimated ionic mobility value can be determined using at least one additional parameter, and the additional parameter can be a known ionic mobility value of the material without distortions. The method can further comprise calculating a first and second estimated thermodynamic stability value. Both the ionic mobility values and the thermodynamic stability values can be compared to select the superior material derivative. Step (iv) can be repeated N times in order to determine N number of ionic mobilities for N material derivatives which are compared to select the superior material derivative. The superior material derivative can have the highest ionic mobility values.

In another aspect, the present disclosure provides a method of manufacturing a solid-state electrolyte to be used in an electrochemical cell. The method can comprise forming a solid-state electrolyte from a material having a compositional property and a structural property, the material having been selected by: (i) calculating one or more distortion parameters of the material, wherein the distortion parameters represent the degree of lattice distortion of the material; (ii) estimating an ionic mobility value of the material using the one or more distortion parameters; and (iii) comparing the estimated ionic mobility value to a predetermined ionic mobility value to determine if the material should be selected.

In this method, the material can be selected from the group consisting of anti-perovskite solid electrolytes. The material can have an anti-perovskite crystalline structure. The material can have the formula X3AB where: X is a mono-valent cation with an electrical charge of +1; A is an anion with an electrical charge of −2; and B is an anion with an electrical charge of −1. In the material, X can be selected from the group consisting of Li, Na, and K; A can be selected from the group consisting of O, S, and Se; and B can be selected from the group consisting of F, Cl, Br, and I. One or more distortion parameters of a material can be calculated using atomic radii. The estimated ionic mobility value can be determined using at least one additional parameter, and the additional parameter can be a known ionic mobility value of the material without distortions. The material can be selected if the estimated ionic mobility value is higher than the predetermined ionic mobility value.

In yet another aspect, the present disclosure provides a non-transitory computer readable storage medium storing one or more programs for execution by one or more processors, the one or more programs including instructions for receiving a selection of a plurality of chemical compositional and structural information for a solid-state electrolyte material; retrieving thermodynamic data for the plurality of chemical phases from a database; calculating one or more distortion parameters of the material, wherein the distortion parameters represent the degree of lattice distortion of the material; and determining an estimated ionic mobility value of the material using the one or more distortion parameters. The material can comprise anti-perovskite solid electrolytes. The material can have an anti-perovskite crystalline structure. The material can have the formula $X_3AB$ where: X is a mono-valent cation with an electrical charge of +1; A is an anion with an electrical charge of −2; and B is an anion with an electrical charge of −1. In the material, X can be selected from the group consisting of Li, Na, and K; A can be selected from the group consisting of O, S, and Se; and B can be selected from the group consisting of F, Cl, Br, and I. One or more distortion parameters of a material can be calculated using atomic radii. The estimated ionic mobility value can be determined using at least one additional parameter. The additional parameter can be a known ionic mobility value of the material without distortions.

In yet another aspect, the present disclosure provides a method for determining an estimated ionic mobility value of a solid-state electrolyte material. The method includes the steps of: (a) receiving a selection of a plurality of chemical compositional and structural information for a solid-state electrolyte material; (b) retrieving thermodynamic data for the plurality of chemical phases from a database; (c) calculating one or more distortion parameters of the material, wherein the distortion parameters represent the degree of lattice distortion of the material; and (d) determining an estimated ionic mobility value of the solid-state electrolyte material using the one or more distortion parameters and optionally using a known ionic mobility value of the solid-state electrolyte material without distortions. The material can comprise anti-perovskite solid electrolytes. The material can have an anti-perovskite crystalline structure. The material can have the formula X3AB where: X is a mono-valent cation with an electrical charge of +1; A is an anion with an electrical charge of −2; and B is an anion with an electrical charge of −1. In the material, X can be selected from the group consisting of Li, Na, and K; A can be selected from the group consisting of O, S, and Se; and B can be selected from the group consisting of F, Cl, Br, and I. One or more distortion parameters of a material can be calculated using atomic radii.

In one aspect, the present disclosure provides a solid-state electrolyte, the solid-state electrolyte comprising a material formed from $Na_3SI$. The material can have an anti-perovskite crystalline structure.

The foregoing and other aspects and advantages of the invention will appear from the following description. In the description, reference is made to the accompanying drawings which form a part hereof, and in which there is shown by way of illustration an example embodiment of the invention. Such embodiment does not necessarily represent the full scope of the invention, however, and reference is made therefore to the claims and herein for interpreting the scope of the invention.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 7 depicts the calculated limiting barriers (meV) along preferred pathways for vacancy and dumbbell migration in anti-perovskite solid electrolytes. For comparison, barriers predicted from percolation theory are given in parentheses. The tolerance factor (t) and Group are also given for each compound.

FIG. 11 depicts migration mechanisms for (a) vacancies and (b) interstitial dumbbells.

FIG. 12 depicts experimentally calculated energies (meV/atom) and tolerance factors, t, for 24 candidate anti-perovskite solid electrolytes. Energies are reported following structure relaxation from three initial structures: orthorhombic, hexagonal, and cubic (Ia-3). Energies are relative to the cubic (Pm-3m) structure. Values in italics indicate the energy of the most stable structure for a given composition. Values marked by an asterisk indicate that large structure changes occurred during relaxation. Compounds marked with † indicate that the halogen and chalcogen spontaneously interchange positions during relaxation; in these cases, the t value for the relaxed structure is also given in parentheses.

FIG. 13 depicts experimental structural parameters for the anti-perovskites $X_3AB$ (X=Li or Na, A=O, S or Se, and B=F, Cl, Br or I). Values in parentheses represent previously calculated data.

FIG. 14 depicts experimentally predicted bulk moduli and band gaps of anti-perovskite compounds. Values in parentheses represent previous density functional theory (DFT) predictions.

FIG. 15 depicts an F-centered structure, $Li_3SF$, wherein (a) shows the structure before relaxation based on the Pnma prototype ($CaTiO_3$), and (b) shows the structure after relaxation and interchange of S and F. The Li ions are situated at the octahedra vertices with F ions at the octahedra center; S-ions occupy the framework positions.

FIG. 19 depicts a graph in (b) showing correlation between the bond length difference and the tolerance factor.

FIG. 20 depicts theoretically calculated decomposition energies, $E_d$, of the anti-perovskites at zero Kelvin. Positive values imply that decomposition into a mixture of chalcogenide and halide is favored. Values in parentheses represent previous DFT predictions.

graphs are ordered based on t.

Figure 24:
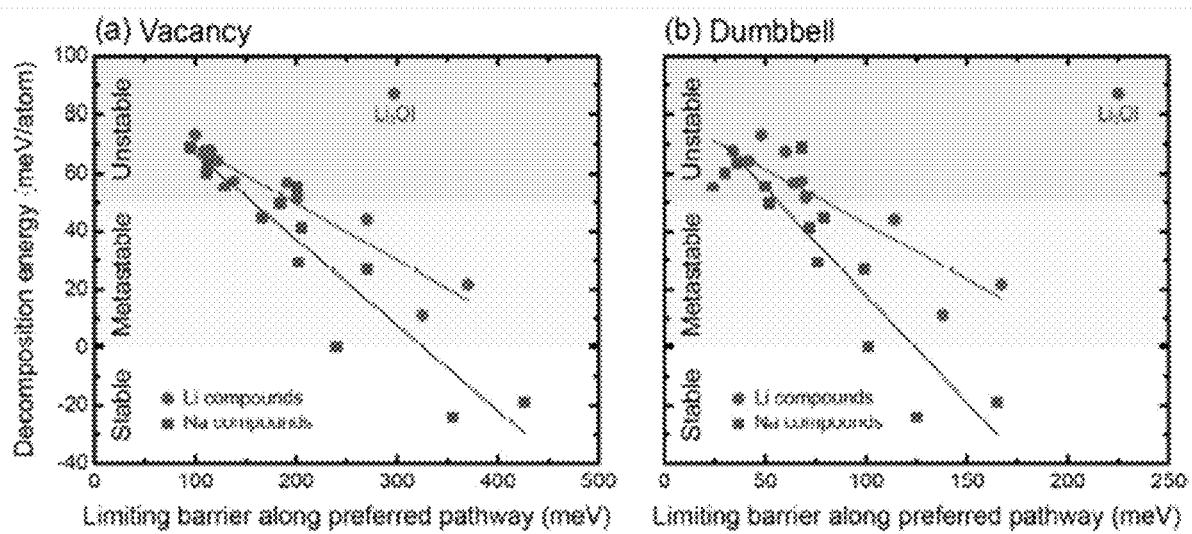

FIG. 24 depicts graphs showing the correlation between the limiting barrier and the decomposition energy, $E_d$ for (a) vacancy (Pearson correlation coefficients are −0.94 and −0.92 for Li and Na compounds, respectively, excluding the $Li_3OI$ outlier) and (b) interstitial dumbbell migrations (Pearson correlation coefficients are −0.88 and −0.90 for Li and Na compounds, respectively, excluding the $Li_3OI$ outlier).

The invention will be better understood and features, aspects and advantages other than those set forth above will become apparent when consideration is given to the following detailed description thereof. Such detailed description makes reference to the drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

The term "distortion" or "lattice distortion" as used herein can refer to a variation in the unit cells which define the symmetry and structure of the entire crystal lattice material.

Figure 1:
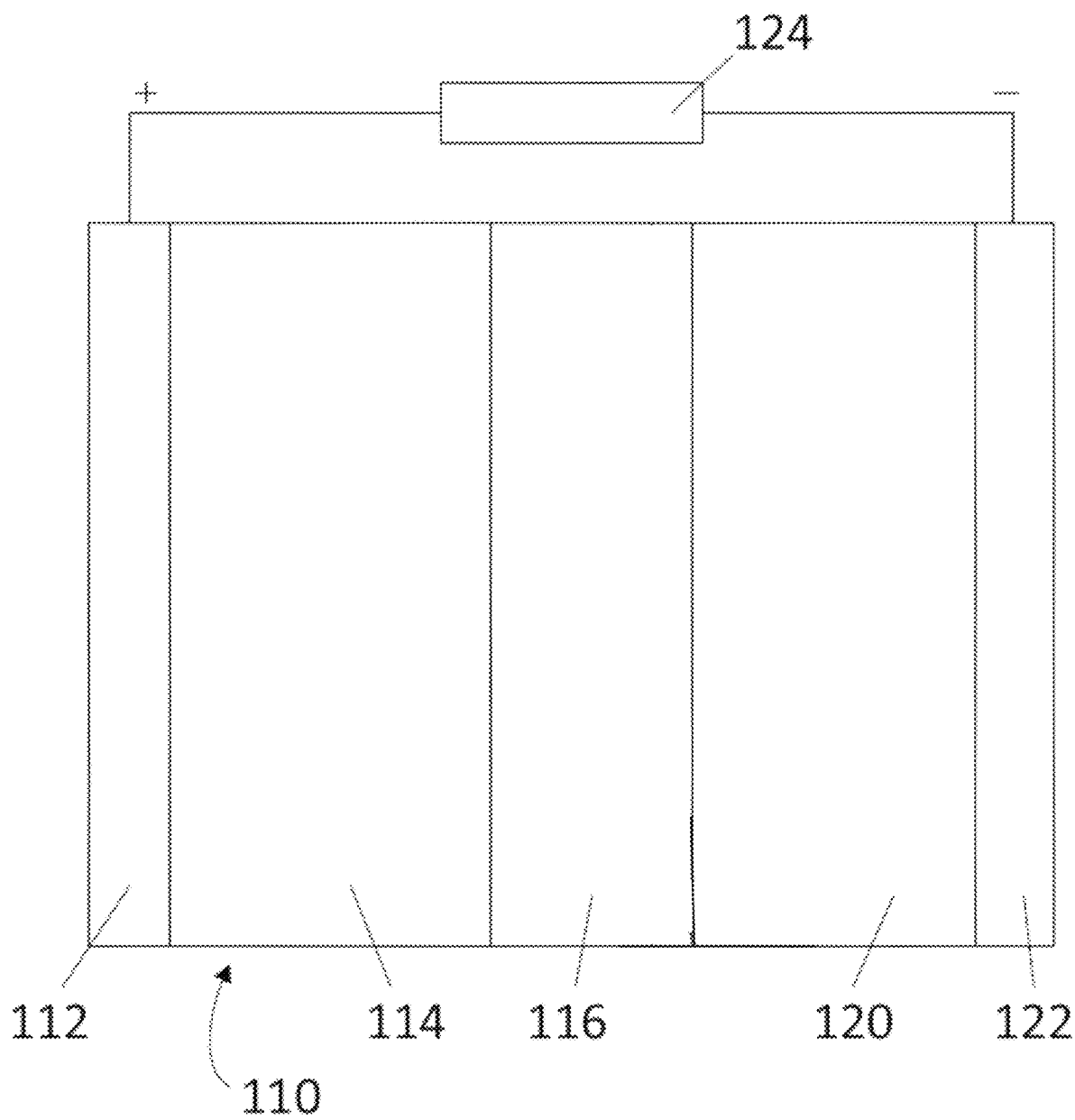
FIG. 1 is a schematic of a lithium metal battery.

FIG. 1 shows a non-limiting example application of a lithium metal battery 110 according to one embodiment of the present disclosure. The lithium metal battery 110 of FIG. 1 includes a first current collector 112 (i.e., aluminum) in contact with a cathode 114. A solid-state electrolyte 116 is arranged between the cathode 114 and an anode 120, which is in contact with a second current collector 122 (i.e., copper). The first current collector 112 and the second current collector 122 of the lithium metal battery 110 may be in electrical communication with an electrical component 124. The electrical component 124 could place the lithium metal battery 110 in electrical communication with an electrical load that discharges the battery or a charger that charges the battery.

The first current collector 112 and the second current collector 122 can comprise a conductive metal or any suitable conductive material. In some embodiments, the first current collector 112 and the second current collector 122 comprise aluminum, nickel, copper, combinations and alloys thereof. In some embodiments, the first current collector 112 and the second current collector 122 have a thickness of 0.1 microns or greater. It is to be appreciated that the thicknesses depicted in FIG. 1 are not drawn to scale. Further, it is to be appreciated that the thickness of the first current collector 112 and the second current collector 122 may be different.

In some embodiments, a suitable cathode 114 of the lithium metal battery 110 is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials. In other embodiments, a suitable material for the cathode 114 of the lithium metal battery 110 is porous carbon (for a lithium air battery), or a sulfur containing material (for a lithium sulfur battery).

In some embodiments, a suitable anode 118 of the lithium metal battery 110 consists of lithium metal. Another example anode 118 material consists essentially of lithium metal. In other embodiments, a suitable anode 118 consists essentially of magnesium, sodium, or zinc metal.

In one aspect, the present disclosure provides a novel technique for evaluating the efficacy of a solid-state electrolyte to be used in an electrochemical cell. The technique uses a discovered correlation between the degree of lattice distortion and the limiting barrier for percolating ion migration. This connection between ionic mobility and lattice distortion can be used to accurately assess a materials ability to function as a solid-state electrolyte. The ability to effectively evaluate materials using distortion parameters has not been fully recognized in previous studies and marks a significant advancement in computational materials science.

Figure 2:
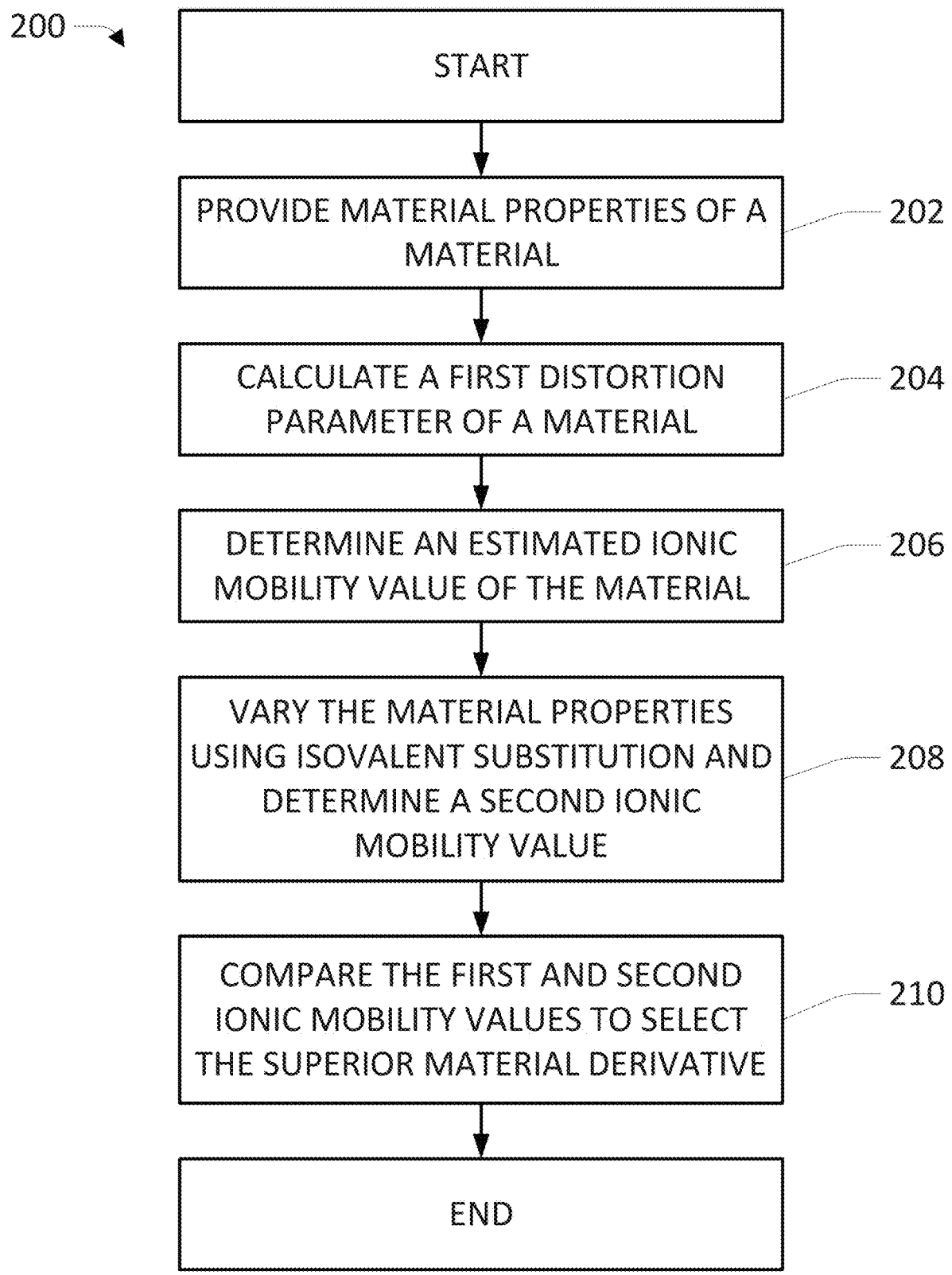
FIG. 2 is a method flowchart for a method of manufacturing a solid-state electrolyte by forming a solid-state electrolyte from a material having a compositional property and a structural property, the material having been selected using the steps of the chart.

FIG. 2 depicts a method flowchart 200 for a method of manufacturing a solid-state electrolyte by forming a solid-state electrolyte from a material having a compositional property and a structural property, the material having been selected by providing material properties of a material, wherein the material properties comprise both compositional and structural information 202; calculating a first distortion parameter of a material, wherein the first distortion parameter represents the degree of lattice distortion of the material 204; determining an estimated ionic mobility value of the material using the one or more distortion parameters 206; varying the provided material properties using isovalent substitution and determining a second ionic mobility value from a second distortion parameter by repeating above three steps 208; and comparing the first and second ionic mobility values to select the superior material derivative 210.

In the method 200, the material can comprise anti-perovskite solid electrolytes. Further, the material can have an anti-perovskite crystalline structure. The material can have the formula $X_3AB$ where: X is a mono-valent cation with an electrical charge of +1; A is an anion with an electrical charge of −2; and B is an anion with an electrical charge of −1. X may be selected from the group consisting of Li, Na, and K. X may also be another comparable element. A may be selected from the group consisting of O, S, and Se. A may also be another comparable element. B may be selected from the group consisting of F, Cl, Br, and I. B may also be another comparable element.

In the method step 204, the distortion parameter of the material may be calculated using atomic radii. Additional parameters may be used to determine the distortion parameter of the material. In the method step of 206, the estimated ionic mobility value may be determined using at least one additional parameter which is not the distortion parameter. The additional parameter may be a known ionic mobility value of the material without distortion. The method 200 may further comprise calculating a first and second estimated thermodynamic stability value. In this version of the method, both the ionic mobility values and the thermodynamic stability values can be compared to select the superior material derivative.

The method step 208 may be repeated N times in order to determine N number of ionic mobilities for N material derivatives which are compared to select the superior material derivative. The value of N may be at least 10, 50, 100, 200, 500, 1,000, or 10,000. The superior material derivative may be the one with the highest ionic mobility values.

Figure 3:
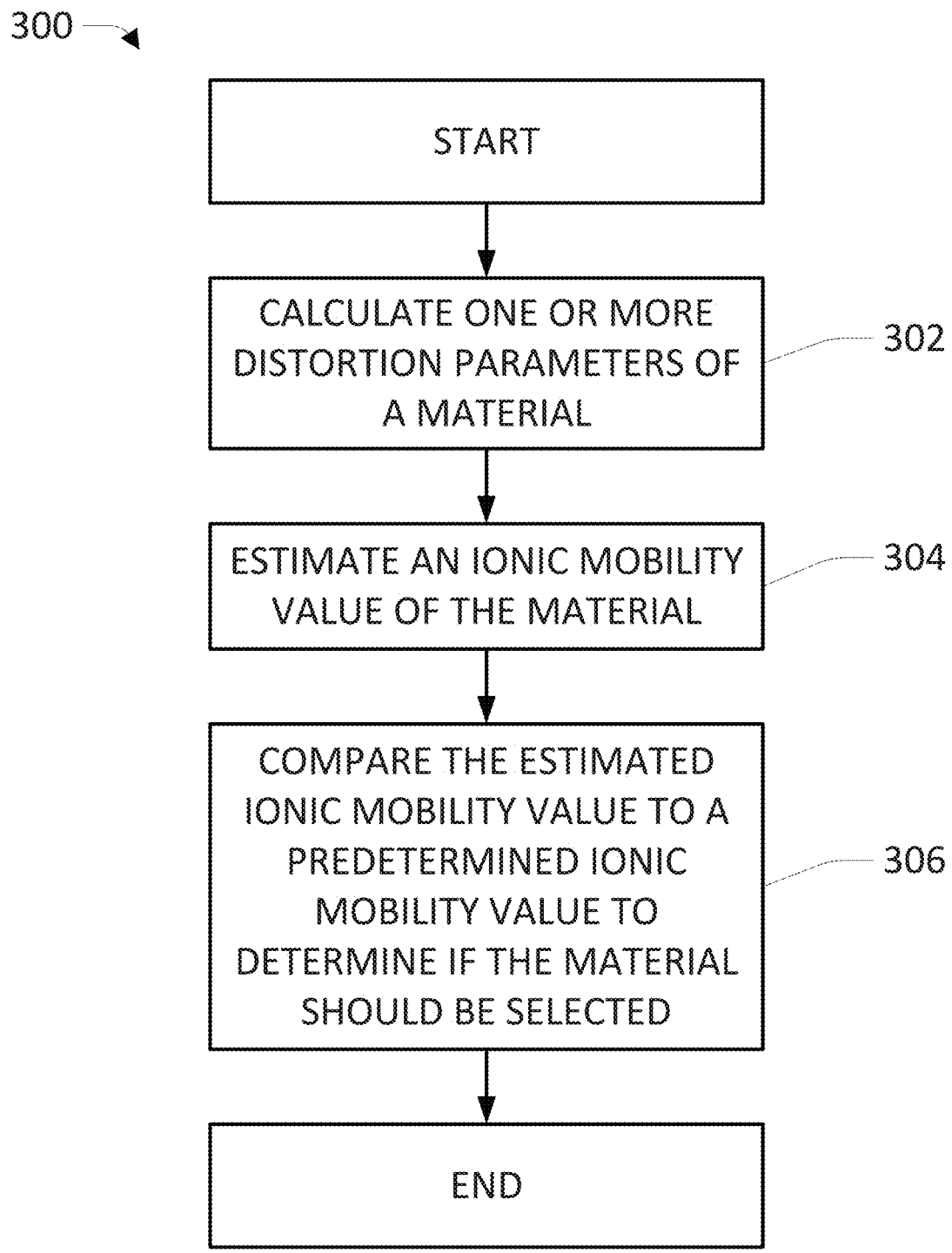
FIG. 3 is a method flowchart for another method of manufacturing a solid-state electrolyte by forming a solid-state electrolyte from a material having a compositional property and a structural property, the material having been selected using the steps of the chart.

FIG. 3 depicts a method flowchart 300 for a method of manufacturing a solid-state electrolyte by forming a solid-state electrolyte from a material having a compositional property and a structural property, the material having been selected by calculating one or more distortion parameters of the material, wherein the distortion parameters represent the degree of lattice distortion of the material 302; estimating an ionic mobility value of the material using the one or more distortion parameters 304; and comparing the estimated ionic mobility value to a predetermined ionic mobility value to determine if the material should be selected 306.

In the method 300, the material can comprise anti-perovskite solid electrolytes. Further, the material can have an anti-perovskite crystalline structure. The material can have the formula $X_3AB$ where: X is a mono-valent cation with an electrical charge of +1; A is an anion with an electrical charge of −2; and B is an anion with an electrical charge of −1. X may be selected from the group consisting of Li, Na, and K. X may also be another comparable element. A may be selected from the group consisting of O, S, and Se. A may also be another comparable element. B may be selected from the group consisting of F, Cl, Br, and I. B may also be another comparable element.

In the method step 302, the distortion parameter of the material may be calculated using atomic radii. Additional parameters may be used to determine the distortion parameter of the material. In the method step of 304, the estimated ionic mobility value may be determined using at least one additional parameter which is not the distortion parameter. The additional parameter may be a known ionic mobility value of the material without distortion. The method 300 may further comprise calculating a first and second estimated thermodynamic stability value. In this version of the method, both the ionic mobility values and the thermodynamic stability values can be compared to select the superior material derivative.

In yet another aspect, the present disclosure provides a non-transitory computer readable storage medium storing one or more programs for execution by one or more processors, the one or more programs including instructions for receiving a selection of a plurality of chemical compositional and structural information for a solid-state electrolyte material; retrieving thermodynamic data for the plurality of chemical phases from a database; calculating one or more distortion parameters of the material, wherein the distortion parameters represent the degree of lattice distortion of the material; and determining an estimated ionic mobility value of the material using the one or more distortion parameters.

In the non-transitory computer readable storage medium, the material can comprise anti-perovskite solid electrolytes. Further, the material can have an anti-perovskite crystalline structure. The material can have the formula $X_3AB$ where: X is a mono-valent cation with an electrical charge of +1; A is an anion with an electrical charge of −2; and B is an anion with an electrical charge of −1. X may be selected from the group consisting of Li, Na, and K. X may also be another comparable element. A may be selected from the group consisting of O, S, and Se. A may also be another comparable element. B may be selected from the group consisting of F, Cl, Br, and I. B may also be another comparable element.

In the non-transitory computer readable storage medium, the distortion parameter of the material may be calculated using atomic radii. Additional parameters may be used to determine the distortion parameter of the material. The estimated ionic mobility value may be determined using at least one additional parameter which is not the distortion parameter. The additional parameter may be a known ionic mobility value of the material without distortion. The one or more programs of the non-transitory computer readable storage medium may further include instructions for further comprise calculating a first and second estimated thermodynamic stability value. In such a version, both the ionic mobility values and the thermodynamic stability values can be compared to select the superior material derivative.

The above techniques were used to discover a material with potential to operate as an effective solid-state electrolyte 116 material for the lithium metal battery 110. The solid-state electrolyte can comprise a material formed from $Na_3SI$. The solid-state electrolyte can essentially consist of a material formed from $Na_3SI$. The solid-state electrolyte can consist of a material formed from $Na_3SI$. Sodium sulfide iodide is a material that has not been synthesized or used in previous electrochemical cells.

EXAMPLES

The following examples are provided in order to demonstrate and further illustrate certain embodiments and aspects of the present disclosure and are not to be construed as limiting the scope of the disclosure.

Example 1

A study was conducted in order to evaluate the ability to exploit—or tune—the degree of distortion to further improve conductivity in solid-state electrolytes.

The anti-perovskite (AP) family of compounds presents an ideal venue to explore these connections. The degree of lattice distortion in the APs can be systematically tuned via atom substitution, yet the relative simplicity of the structure allows for a comprehensive characterization of ion mobility. Moreover, since disorder and distortions typically correlate with a material's stability, the APs also present a vehicle for probing how changes to stability impact the rates of ion migration.

APs adopt the well-known structure of the perovskites, but interchange the positions of the anions and cations. APs of interest for SEs adopt the formula $X_3AB$, where X represents a mono-valent cation, and A and B are anions with respective charges of 2- and 1-. Included in these candidates is the so called 'Li-rich' AP, $Li_3OCl$ (LOC, FIG.

10), which exhibits a high ionic conductivity of ~$10^{-3}$ S/cm at room temperature. The degree of lattice distortion in AP can be controlled through isoelectronic substitution. The AP crystal structure consists of vertex-sharing octahedra, with the cations, X, occupying the octahedron vertices, FIG. 4. Chalcogenide anions, A, reside at the center of the octahedra, while halogen ions, B, sit at the vertices of a cubic framework. The degree of distortion in APs is described by the Goldschmidt tolerance factor, t: $t=(R_x+R_B)/[\sqrt{2}(R_x+R_A)]$, where $R_x$ refers to the atomic radius of the cation (X), $R_B$ refers to the radius of the framework halogen (B), and $R_A$ is the same quantity for the chalcogenide ion (A) at the octahedron center. When t~1 the ions fill space nearly perfectly, resulting in a highly symmetric structure with a cubic (or nearly-cubic) unit cell. To date, the APs that have been examined as SEs generally fall into this category.

Lattice distortions in the AP structure emerge for compositions comprised of ions having with mismatched sizes. For example, in LOC, chalcogens such as S and Se can be substituted for oxygen, while halogens such as F, Br, and I can replace Cl. These compounds exhibit a greater mismatch in atomic sizes, characterized by a decrease in the tolerance factor, t<1, resulting in an increase in lattice distortion. The distortion manifests as tilting and distortions of the octahedra, and deviation from cubic symmetry, FIG. 4. APs with tolerance factors close to unity crystallize with in the cubic Pm-3m space group. By analogy with the regular perovskites, as t decreases in the APs other space groups are expected to successively emerge (orthorhombic Pnma, hexagonal $P6_3cm$, and cubic Ia-3). Moreover, t has also been correlated with thermodynamic stability, with smaller t values typically indicating a greater tendency for decomposition.

Without being bound by theory, there are two common suspected mechanisms for Li-ion transport in LOC. These include a vacancy mechanism involving Li-ion hopping along the edges of the Li-octahedra, in (a) of FIG. 11, and hopping of a Li interstitial dumbbell, in (b) of FIG. 11. The relative importance of these mechanisms remains a matter of debate. The interstitial process has a barrier that is roughly half that of the vacancy mechanism. It has been suggested that Li vacancies are responsible for the high conductivity in pristine and divalent-metal doped LOC, owing to their higher vacancy concentration compared to Li interstitials. On the other hand, interstitials have been predicted to dominate in samples synthesized under LiCl-deficient conditions, where an elevated concentration of oxygen substitutional defects on Cl sites ($O'_{cl}$) is anticipated. Others have argued, however, that the high binding energy between Li interstitials and $O'_{cl}$, will hinder interstitial hopping.

Composition variation has been explored as a means to increase the ionic conductivity of AP SEs. For example, the mixed-halogen phase, $Li_3Cl_{0.5}Br_{0.5}$, exhibits a conductivity that is approximately twice that of LOC at room temperature. It has been proposed that this is due to a wider channel for Li-ion migration, which was made possible by an enlarged unit cell. Similarly, a computational study claimed that Cl—Br substitutional disorder results in a spectrum of activation barriers, with some barriers being lower than those in LOC and LOB. It has also been predicted that $Li_3OCl_{0.75}Br_{0.25}$ to be the optimal mixed phase, with maximum ionic conductivity. The sodium analogues of LOC—$Na_3OCl$ (NOC), $Na_3OBr$ (NOB), $Na_3OI$ (NOI), and their respective mixed-halogen phases—have also been previously synthesized. Of these, $Na_3OBr_{0.6}I_{0.4}$ was reported to have a higher conductivity than either NOC or NOB.

In this study, we systematically probed the connection between ionic mobility, thermodynamic stability, and lattice distortion across a series of 24 model APs. The degree of distortion, quantified by the tolerance factor, t, is varied via substitution of isovalent elements on the cation (X=Li or Na) and anion sublattices (A=O, S, or Se; and B=F, Cl, Br, or I). Density functional theory calculations were used to evaluate the energy barriers for all relevant ion migration pathways, assuming both vacancy and interstitial mechanisms.

Our results reveal that 'distortion tuning' can provide a pathway to higher ionic conductivity. More specifically, a strong correlation is observed between the degree of lattice distortion and the minimum energy barrier for percolating ion migration: compounds with the largest distortion exhibit the lowest migration barriers, independent of the migration mechanism. This trend is confirmed by a percolation theory analysis based on the connectivity of cation sites and the distribution of elementary energy barriers. Consistent with earlier studies, the energetic spread between the largest and smallest migration barriers for a given compound increases with increasing distortion. Thus, distortion slows migration along some pathways, while speeding up others. Fast pathways result from a combination of channel widening and destabilization of the equilibrium configuration. At the same time, a higher degree of distortion also correlates with diminished thermodynamic stability. Therefore, realizing high ionic mobility in this class of conductors requires balancing a tradeoff with stability. The new anti-perovskite with composition $Na_3SI$ is identified as one such 'balanced' material. In total, this work aids in the design of optimal solid electrolytes by revealing the connections between lattice distortion, mobility, and stability.

Method Development

DFT calculations were performed with the Vienna ab initio Simulation Package (VASP). The Perdew-Burke-Ernzerhof (PBE) exchange-correlation functional was used in combination with the projector augmented wave (PAW) method. The following valence electron configurations were adopted: $2s^1$ for Li, $3s^1$ for Na, $2s^22p^4$ for O, $2s^22p^5$ for F, $3s^23p^4$ for S, $3s^23p^5$ for Cl, $4s^24p^4$ for Se, $4s^24p^5$ for Br, and $5s^25p^5$ for I. The plane-wave basis included functions with kinetic energies up to 450 eV. The Brillouin zone was sampled with an r-centered k-point mesh, and sampling was performed on grids ranging from 8×8×8 for the smallest computational cells (alkali metal halides) to 2×2×2 for the largest systems (quasi-cubic systems with space group Ia-3, containing 80 atoms per cell). These sampling densities yielded energy convergence to within 1-2 meV/atom. The energy criterion for convergence of the self-consistency loop was set to $10^{-5}$ eV, and the force criterion for the relaxation of geometric degrees of freedom (ion positions and cell geometry) was 0.01 eV/Å.

The nudged elastic band (NEB) method was used to evaluate energy barriers for cation migration via vacancy and interstitial 'dumbbell' mechanisms. NEB calculations were performed on enlarged supercells based on a 3×3×3 replication (135 atoms) of the unit cell for cubic Pm-3m compounds, and a 2×2×1 replication (80 atoms) for quasi-orthorhombic compounds. K-point sampling was performed at the r-point for cubic supercells, and with a reentered 1×1×2 k-point mesh for the quasi-orthorhombic systems. Three intermediate NEB images were used, and the force convergence criterion was set to 0.03 eV/Å. It was assumed that the interstitial dumbbells do not rotate during migration, as the barrier for rotation has been reported to be more than twice that for translation.

Many-body perturbation theory (GW method) was used to predict the band gaps of the various AP phases. The bandgaps provide an upper bound for the electrochemical window of a given SE.

The electrochemical stability of solid electrolytes is important for the performance of batteries. The electrochemical potentials of the anode and cathode should be located within the electrochemical window of the electrolyte to prevent reduction and/or oxidation of the electrolyte. The band gap of the electrolyte gives the upper limit of the battery voltage. Thus, large band gaps are desirable. Previous DFT studies predicted the band gaps of $Li_3OCl$ and $Li_3OBr$ (6.39 and 5.84 eV, respectively) using hybrid functionals. Although hybrid functionals are more accurate than local (LDA) or semi-local (GGA) functionals, in general they underestimate band gaps.

To provide a more accurate estimate of the bandgaps of the anti-perovskite compounds examined here, two variants of GW method were employed: (i.) the 'single-shot' $G_0W_0$, with input wavefunctions evaluated with the HSE06 hybrid functional, and (ii.) the partially self-consistent $GW_0$ method, which uses wavefunctions evaluated from a prior PBE calculation. In the $GW_0$ approach, the eigenvalues are updated, while the wavefunctions are kept fixed. These two GW variants have yielded very good agreement with experimental band gaps. Both calculations used 1024 bands and 64 frequency points; 4 iterations were performed in the $GW_0$ calculations. Test calculations with larger values for these parameters showed no significant change to the band gaps.

The band gaps of Li/Na anti-perovskites predicted by these GW methods are summarized in FIG. 14. The $G_0W_0$ method with HSE06 hybrid functional input wavefunctions gives slightly larger band gaps than the $GW_0$-GGA method. Generally, the band gaps are smaller for those compounds containing larger halogens and chalcogens. The lithium-based compounds have band gaps of 6 eV or larger, while the sodium-based systems have gaps in the range of 4-5 eV.

The thermodynamic stability of the AP phases was assessed using the convex hull concept. The energy relative to the convex hull, $E_H$, was calculated as: $E_H=[E_{AP}-(E_{chalcogenide}+E_{Halide})]/N$ where $E_{AP}$ is the total energy per formula unit (f.u.) of the $X_3AB$ AP phase, and $E_{chalcogenide}$ & $E_{Halide}$ represent, respectively, the total energies (per f.u.) of the appropriate chalcogenide or halide end members. (For example, in the case of LOC, these end members would be $Li_2O$ and LiCl.) N=5 is the number of atoms per f.u. for the APs. A negative value for $E_H$ indicates that a given AP is thermodynamically stable with respect to decomposition into a mixture of the end members; conversely, a positive $E_H$ indicates a metastable (50 meV>$E_H$>0), or unstable phase ($E_H$>50 meV).

Results

LOC, LOB, and their Na analogues—NOC, NOB, and NOI—have been synthesized previously. These compounds adopt a cubic structure with space group Pm-3m. Isoelectronic substitution on the cation (X=Li or Na) and anion sublattices (A=O, S, or Se; and B=F, Cl, Br, or I) results in 19 additional (hypothetical) AP compositions. As discussed above, ion substitution will result in a change to the tolerance factor, and potentially convert the cubic Pm-3m structure (generally present for 0.9<t<1.0) into one of three other structure types: orthorhombic (Pnma, for tolerance factors roughly between 0.75 and 0.9), hexagonal (P6$_3$cm, t≤0.75), and cubic (Ia-3, for tolerance factors beyond the hexagonal regime). Initial structures adopting the 4 structure types were generated for each of the 24 possible compositions. These structures were based on the following prototypes: $Li_3OCl$ (Pm-3m), $CaTiO_3$ (Pnma), $HoMnO_3$ (P6$_3$cm), and $ScFeO_3$ (Ia-3). All structures were fully relaxed, with the resulting energy-volume data fit to the Murnaghan equation of state (EOS):

$$E(V) = \frac{B_0 V}{B_0'(B_0'-1)}\left[B_0'\left(1-\frac{V_0}{V}\right)+\left(\frac{V_0}{V}\right)^{B_0'}-1\right]+E_0.$$

Here $B_0$ is the bulk modulus, $B_0'$ is the pressure derivative of the bulk modulus, $V_0$ is the equilibrium volume and $E_0$ is the constant. The structural parameters of AP compounds and corresponding bulk moduli are listed in FIGS. 13 and 14.

In addition to deviations from cubic symmetry, additional distortion in the perovskites is manifested via perturbations to the octahedral building blocks. These include: octahedron tilting, displacement of the octahedron's central ion, and distortion of the octahedron shape, resulting in deviations to the octahedron's bond lengths and angles. These distortions can occur independently or simultaneously.

Figure 12:
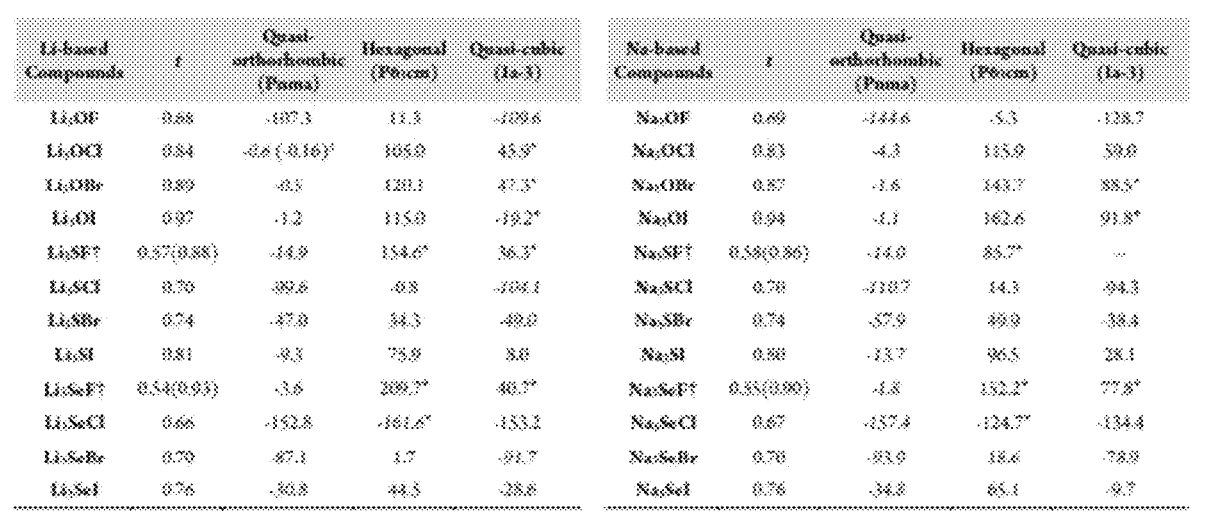

The tolerance factors and calculated energies (relative to that of the cubic Pm-3m variant) for all 24 compounds examined were compiled, as shown in FIG. 12.

The tolerance factors were evaluated using the reported ionic radii. The tolerance factor approaches unity upon substitution of larger halogen ions and smaller chalcogen ions. Conversely, t is generally smallest for substitutions of large chalcogens and small halogens, e.g., $Li_3SeCl$ (t=0.66). In the case of the initially orthorhombic and cubic (Ia-3) cells, upon relaxation the lattice vectors of these systems exhibit slight distortions from their original orthogonal orientations (deviations are less than 0.1° and 5.3°, respectively); thus, we refer to these structures as 'quasi-orthorhombic' and 'quasi-cubic.' No distortions to the lattice vector angles were observed in the hexagonal structures. Surprisingly, during relaxation of the F-containing compounds $Li_3SF$, $Li_3SeF$, $Na_3SF$, and $Na_3SeF$, the chalcogen and halogen ions interchanged positions via rearrangement of the Li-ion sublattice (FIG. 15). This rearrangement positions F at the center of the Li octahedra, and increases the tolerance factor significantly.

During relaxation of the F-based compounds $Li_3SF$, $Li_3SeF$, $Na_3SF$, and $Na_3SeF$, the chalcogen and halogen ions spontaneously interchange positions via rearrangement of the Li-ion sublattice (FIG. 15). The initial structures of these compounds have very low tolerance factors, t<0.6, due to the small ionic radius of F. As discussed elsewhere, a lower tolerance factor correlates with lower stability, thus a structure change resulting from instabilities is not unexpected. The observed rearrangements partially remedy the instability, as the interchanged compounds exhibit much higher tolerance factors, t>0.86. The resulting low-energy structures are quasi-orthorhombic. $Li_3SeF$ and $Na_3SeF$ are treated as cubic Pm-3m (Group 1), however, due to the negligible energy differences (<4 meV/atom) between the cubic and quasi-orthorhombic structures. $Li_3SF$ and $Na_3SF$ have moderately distorted structures, placing them in Group 2.

The calculations predict that the quasi-orthorhombic structures are generally the lowest in energy. For a few compositions, the energy of the quasi-orthorhombic structure is nearly identical to (<5 meV/atom difference) that of the cubic (Pm-3m) or quasi-cubic (Ia-3) variants. These cases include LOC, LOB, NOC, NOB and NOI, which, based on previous experiments, crystallize in the Pm-3m structure. Given the computational and experimental preference for the Pm-3m and quasi-orthorhombic structures, these two systems were adopted for subsequent calculations of migration barriers. The structural parameters, bulk moduli, and band gaps for all low-energy structures were also compiled.

Figure 4:
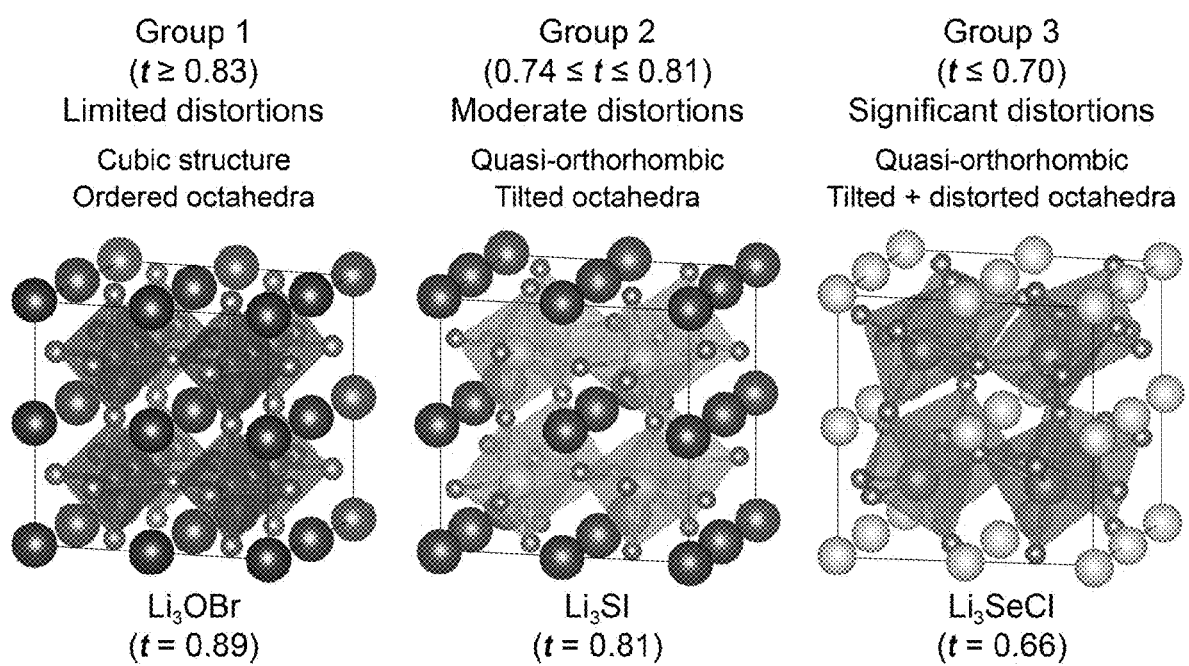
FIG. 4 depicts a classification scheme for Li-based and Na-based anti-perovskite solid electrolytes based on their degree of lattice distortion. Compounds in Group 1 have a high tolerance factor, exhibit highly ordered octahedra, and adopt the cubic Pm-3m structure. Groups 2 and 3 have quasi-orthorhombic structures, and are characterized by successively smaller tolerance factors and increasingly larger distortions of the Li/Na-octahedra. Three representative structures ($Li_3OBr$, $Li_3SI$, and $Li_3SeCl$) illustrate the increasing degree of lattice distortion from Group 1 to Group 3.

The AP examined here were further classified into three groups based on their tolerance factor and the degree of distortion of their octahedra. FIG. 4 illustrates this classification. 'Group 1' includes cubic Pm-3m compounds having well-ordered octahedra and tolerance factors t≥0.83. This behavior is similar to that of the cubic perovskite oxides, whose tolerance factors typically fall between 0.9 and 1.0. As the tolerance factor decreases, mismatch in atomic radii leads to moderate distortion via tilting of the octahedra, and a change in symmetry to quasi-orthorhombic, FIG. 4, Group 2. Here, 0.74≤t≤0.81, and the degree of octahedron tilting (11.6-19.5°) increases with decreasing t. Finally, in Group 3, t≤0.7, and the system remains quasi-orthorhombic. These systems have significant distortion associated with the octahedra, including tilting (21.0-27.1°) and X-A-X bond angle distortions (7.3-12.9°).

Under equilibrium conditions, the formation energies of charge carriers (vacancies or interstitials) can impact mobility and conductivity. However, experiments on the AP have shown that the concentrations of these species are controlled by synthesis conditions and kinetics. The non-equilibrium nature of these concentrations suggests that migration energies are of paramount importance in understanding ionic mobility, and motivates our emphasis on migration energies.

Figure 16:
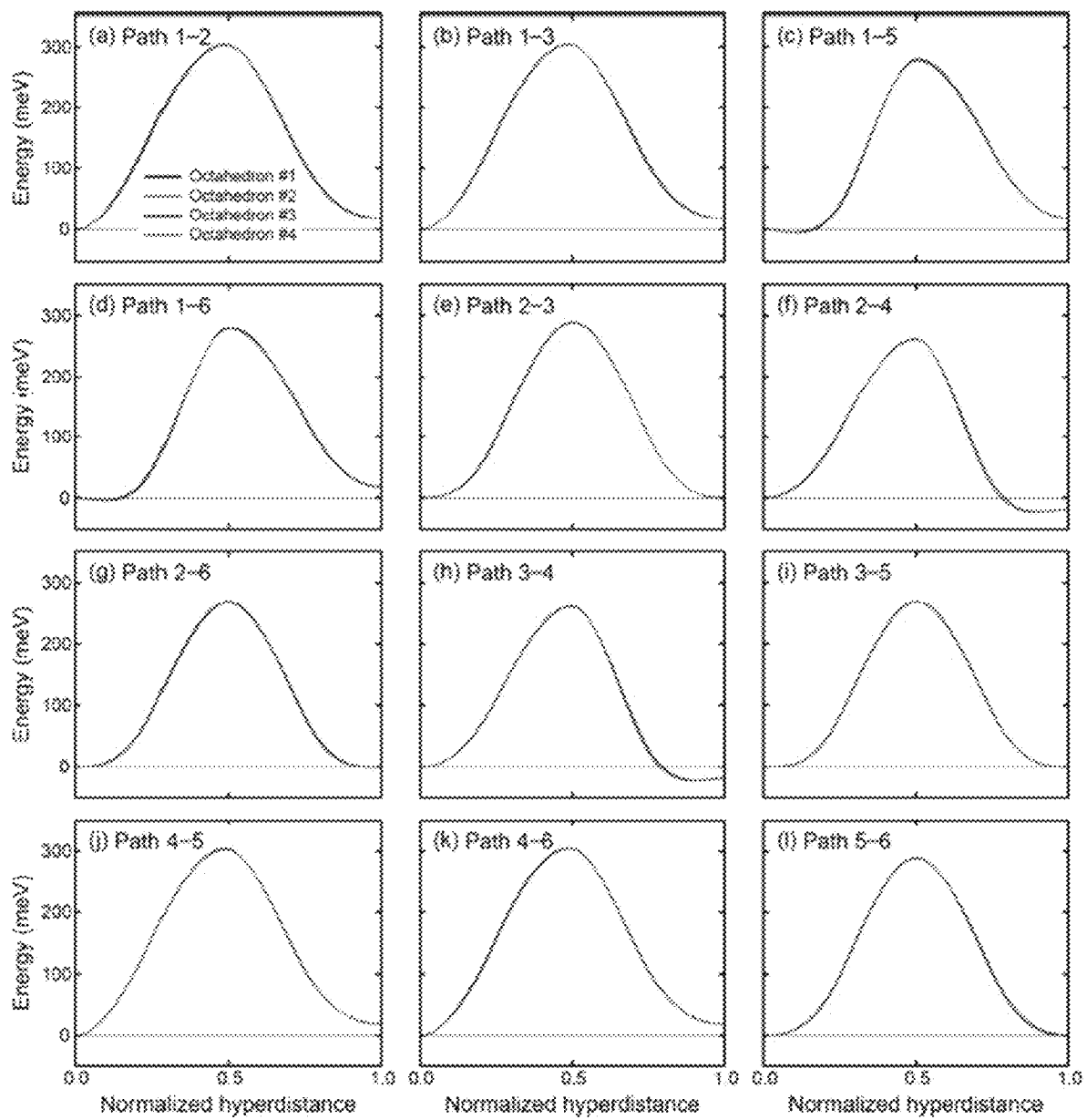
FIG. 16 depicts graph comparison of elementary vacancy migration barriers evaluated for the 12 possible migration paths on the 4 distinct octahedra in $Li_3SI$. Hopping paths are labelled according to the cation position. The data show that the difference in hopping barriers on distinct octahedra can be considered negligible.

The simplicity of the AP structure allows for a comprehensive sampling of the activation energies and minimum energy pathways associated with ion migration. NEB calculations were used to evaluate these pathways for both the vacancy and interstitial dumbbell mechanisms. The elementary migration events that comprise these two mechanisms involve ion hopping along the 12 edges of the Li/Na octahedra. Due to the high symmetry of the cubic AP, the 12 pathways in this system are degenerate; it is therefore sufficient to evaluate a single path for each of the two mechanisms. In contrast, in the lower-symmetry quasi-orthorhombic systems the presence of octahedron distortion results in 12 distinct elementary migration paths. These quasi-orthorhombic compounds contain four distinct octahedra per unit cell. Nevertheless, these octahedra exhibit very similar structures—the maximum structural deviations between octahedra are in all cases less than 2.4%: X—A bond lengths (<0.2% deviation), X-A-X bond angles (<1.3%), distances between alkali-metal ions ($d_{X-X}$<1.0%), and distances between alkali-metal ions and framework anions ($d_{X-B}$<2.4%). Due to the near-equivalence of the octahedra, it is sufficient to map out migration mechanisms along the 12 pathways that orbit a single octahedron. This assertion was tested by calculating all 48 barriers for the vacancy mechanism in $Li_3SI$, the AP having the largest structural deviations between octahedra. As expected, the differences between elementary barriers on distinct octahedra (FIG. 16) were found to be small, less than 1.4%.

Figure 5:
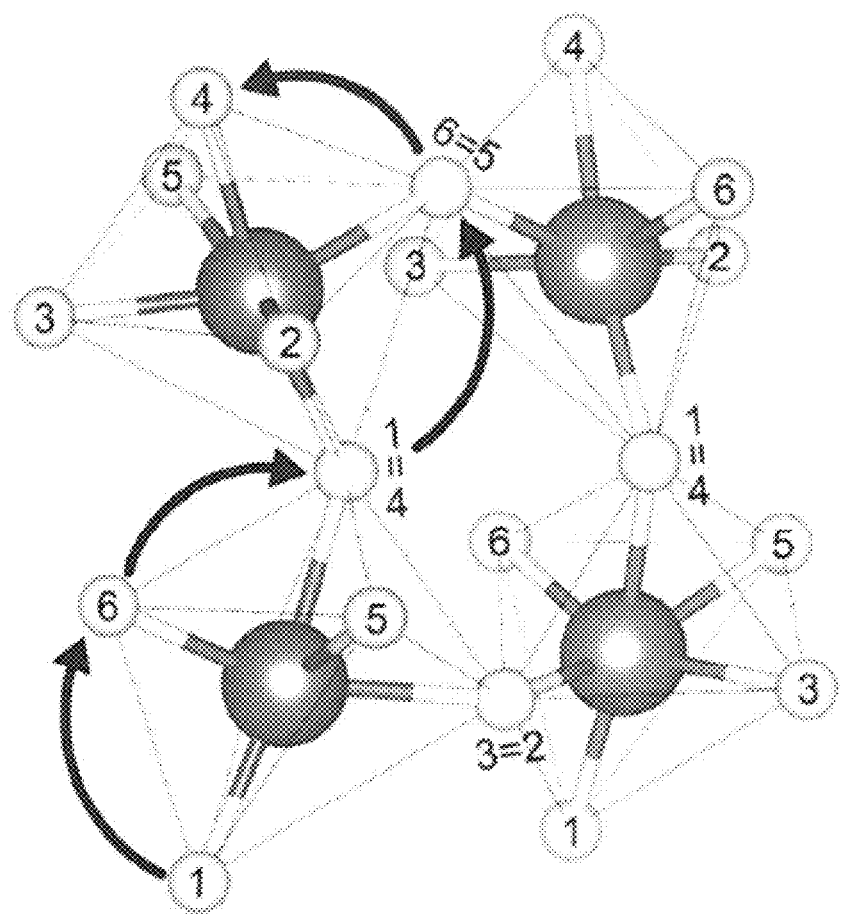
FIG. 5 depicts a representation of the connectivity between octahedra in distorted anti-perovskites. Atomic sites of mobile ions are numbered; identical sites in different octahedra adopt the same number. (Selected shared vertex sites are indicated with an equals sign.) Arrows illustrate an example of a migration pathway resulting in long-range ion transport.

FIG. 5 shows the connectivity between octahedra in a representative Group 3 distorted AP structure, $Li_3SeCl$ (t=0.66). Mobile cations are located at the octahedron vertices, which are shared by adjacent octahedra. The cations in each octahedron are labeled 1 through 6; equivalent labels are shown at the shared vertices for selected ions. Using this labeling scheme, a percolating pathway (i.e., one which allows for macroscopic ion migration) can be identified by the numerical sequence of sites visited during the migration process. For example, the arrows in FIG. 5 depict a pathway that starts at the bottom of the bottom-left octahedron and terminates at the top edge of the top-left octahedron: 1→6→4 (=1)→6→4 (=1).

The goal was to find low-energy migration pathways that contribute to long-range (percolating) ion transport. These pathways were identified by combining multiple elementary migration events. Here, an elementary migration event corresponds to the hop of a vacancy or an interstitial dumbbell to an adjacent octahedral site along an octahedron edge. The following procedure was employed to find percolating pathways (see FIG. 17 for an example): (1) One of the six cation sites on an octahedron is selected as the initial position for a vacancy or interstitial. (2) The defect migrates to an adjacent site along the path having the lowest barrier. (3) At the new site, the barriers for the non-reversing paths are compared to those for the discarded paths from the previous step(s). If all barriers out of the current site are larger than the smallest of the previously-discarded barriers, then the system returns to the previous site and migrates along the discarded pathway with the smallest barrier. Alternatively, the defect continues along the path having the lowest barrier. (4) Step 3 is repeated until a pathway is identified that does not contain closed loops or revisit sites. The pathway should terminate at a site that is crystallographically-equivalent to the initial site. (5) Return to step 1; repeat the process for all possible initial locations of the mobile species. Stitching together multiple elementary migration events will yield a percolating pathway with multiple maxima. The procedure described above identifies the percolating pathway having the smallest maximum migration barrier. We refer to this pathway as the preferred pathway and its associated barrier as the limiting barrier.

Figure 17:
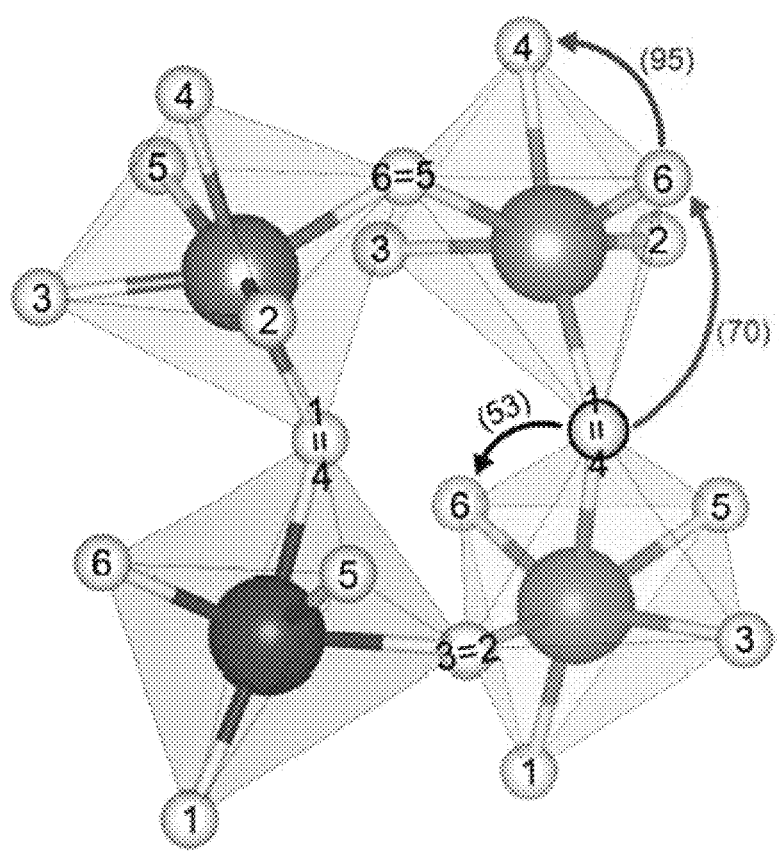
FIG. 17 depicts a pathway example of the procedure used to identify percolating pathways for vacancy migration in $Na_3SeCl$. Values in parentheses are activation energy barriers (in meV) for elementary hops between sites connected by arrows. The site circled in black (1=4) is the starting point for the pathway.

For the example in FIG. 17, long-range ion migration pathways were constructed by combining adjacent elementary hopping events. Here, we describe the procedure for assembling these long-range pathways. (a.) A specific site is selected as an initial position for a vacancy or interstitial (marked as black circle). For demonstration purposes site 4 on the green (bottom-right) octahedron is chosen. (b.) This defect can potentially migrate to positions 2, 3, 5 and 6 on the same octahedron and to positions 2, 3, 5, and 6 on the orange octahedron above. Path 4→6 on the green octahedron is selected as it has the lowest barrier (53 meV) among the 8 available paths (black arrow). (c.) At the new site there are 7 available paths: 3 paths to positions 1, 2, and 5 on the green octahedron (reversing to position 4 is prohibited), and 4 paths in another octahedron (not shown) by following the connection 6=5. The path 6→1 in the green octahedron has the lowest barrier (112 meV) among these 7 paths. However, among the 7 discarded paths in the previous step, the barrier of path 1→6 (red arrow) is 70 meV, which is lower than the 112 meV barrier in the current step. Thus, the search reverts to the previous step and selects the next lowest barrier, path 1→6, into the orange octahedron. (d.) Repeat step 3. At the current step, there are 7 available non-reversing paths: 3 paths to positions 2, 4, and 5 in the orange octahedron, and 4 paths in another octahedron (not shown) by following the connection 6=5. The path into position 4 in the top-right octahedron (6→4, blue arrow) has the lowest barrier (95 meV). This barrier is smaller than any other path discarded previously, thus the defect continues along this path. Due to the connection 4=1, the defect has arrived at a site equivalent to the initial site via pathway 1→6→4 (=1). This pathway has a limiting barrier=95 meV. (e.) Return to step (a.) and repeat steps (a.) to (d.) to examine pathways starting from all other initial positions. This procedure identifies the pathway that has the "smallest maximum" barrier, referred to as the limiting barrier; this pathway will be the most likely pathway to contribute to macroscopic ion migration.

Figure 6:
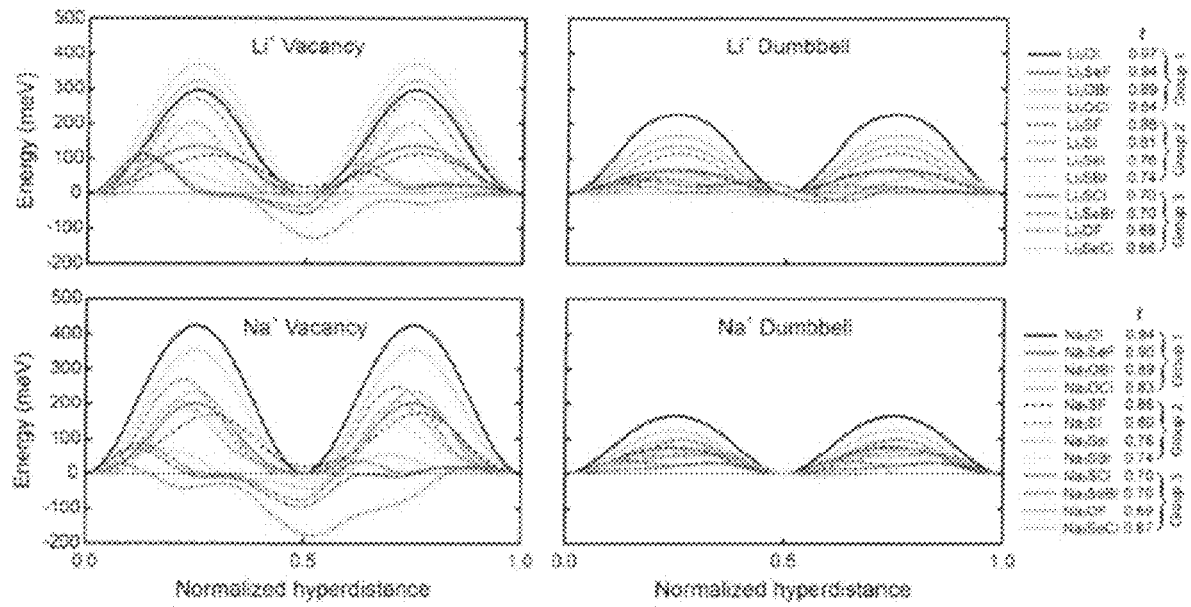
FIG. 6 depicts graphs of the minimum-energy pathways for vacancy and interstitial-dumbbell migration in Li-based and Na-based anti-perovskites. (Negative energies appearing in some of the vacancy-mediated mechanisms indicate a preference for locating the vacancy on certain cation sites. The calculated energy barriers account for uphill steps from these positions.)

FIG. 6 shows the preferred pathways for all 24 AP candidates. The limiting barriers fall within 95-426 meV for the vacancy mechanism, and within 24-165 meV for the interstitial dumbbell. The relatively lower barriers observed for the interstitial mechanism are consistent with prior reports on selected AP SE. Importantly, the range of limiting barriers for all-but-one of the compounds fall below the 400 meV threshold estimated assuming a SE with 10 μm thickness and C/2 rate. Other reports have suggested activation energies in the range of 200-300 meV as being desirable for a viable SE; all but 4 of the APs considered here—all operating via vacancy migration—satisfy this criterion. Moreover, a significant fraction of the APs exhibit barriers that are smaller than or comparable to those reported for state-of-the-art solid electrolytes: $Li_{10}GeP_2S_{12}$ (250 meV), $Li_7La_3Zr_2O_{12}$ (310 meV), $Li_6PS_5Cl$ (110 meV) and $Li_2S$—$P_2S_5$ glass (390 meV). Thus, high ionic conductivity could be possible in these systems if they could be synthesized in a form having high carrier concentrations.

Figure 8:
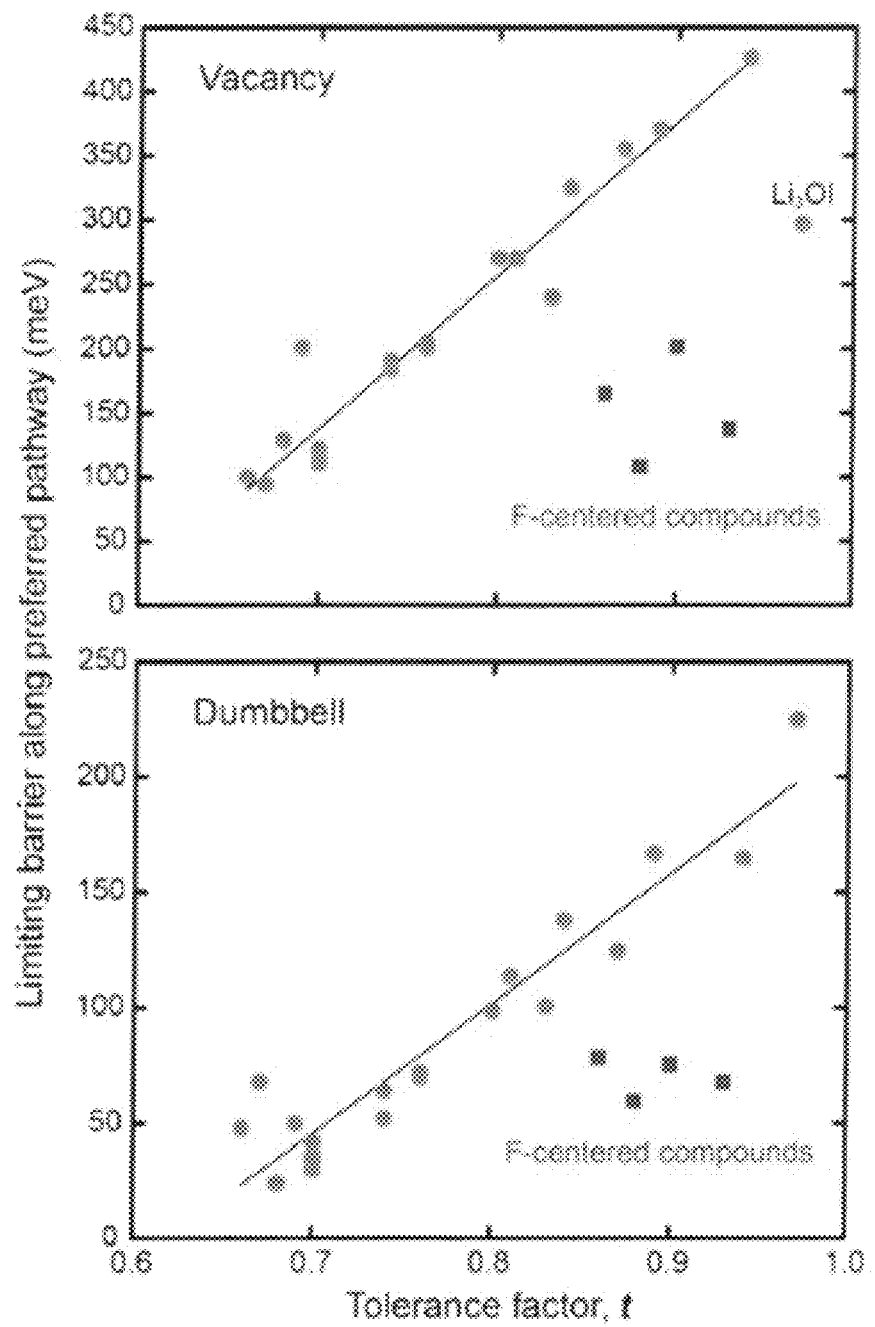
FIG. 8 depicts a graph showing the correlation between tolerance factor, t, and the limiting barrier along the preferred percolating pathway for vacancy (top) and interstitial dumbbell (bottom) migration. Blue squares depict the F-centered compounds.

FIG. 6 suggests that the more distorted Group 2 and 3 AP have smaller limiting barriers than those for the ordered Group 1 systems. FIG. 8 probes the connection between barrier size and distortion by plotting the limiting barrier as a function of the tolerance factor; the barriers and t values for all compounds are summarized in FIG. 7. These data show that the barrier size exhibits a strong linear correlation with the tolerance factor, independent of the migration mechanism (vacancy or dumbbell): larger tolerance factors, indicative of limited distortion, yield higher migration barriers, while smaller values of t (greater distortion) yield lower barriers. Thus, ionic mobility can be maximized by 'distortion tuning': substitution of larger chalcogen and smaller halogen ions within the AP structure results in lower limiting barriers. Interestingly, the F-centered compounds do not follow this trend; these compounds have lower barriers than other compounds with similar t.

An earlier study found that substitution of larger, more polarizable chalcogen anions in $Li_{10\pm1}GeP_2X_{12}$ (via the substitutions X=O→S→Se) lowered activation energies by increasing the width of the cation migration channel. This trend is also present in our data, and will be described in more detail below. In yet another example, increasing the polarizability (and size) of the halogen anions in the argyrodites $Li_6PS_5X$ via the substitutions X=Cl→Br→I resulted in decreasing lattice stiffness, which in turn yielded lower activation energies. This trend is absent in the AP systems studied here: activation energies increase with increasing polarizability of the framework halogen anion. This discrepancy could result from a larger impact from distortion, which could overshadow effects arising from differences in the size and polarizability of the halogens.

Figure 9:
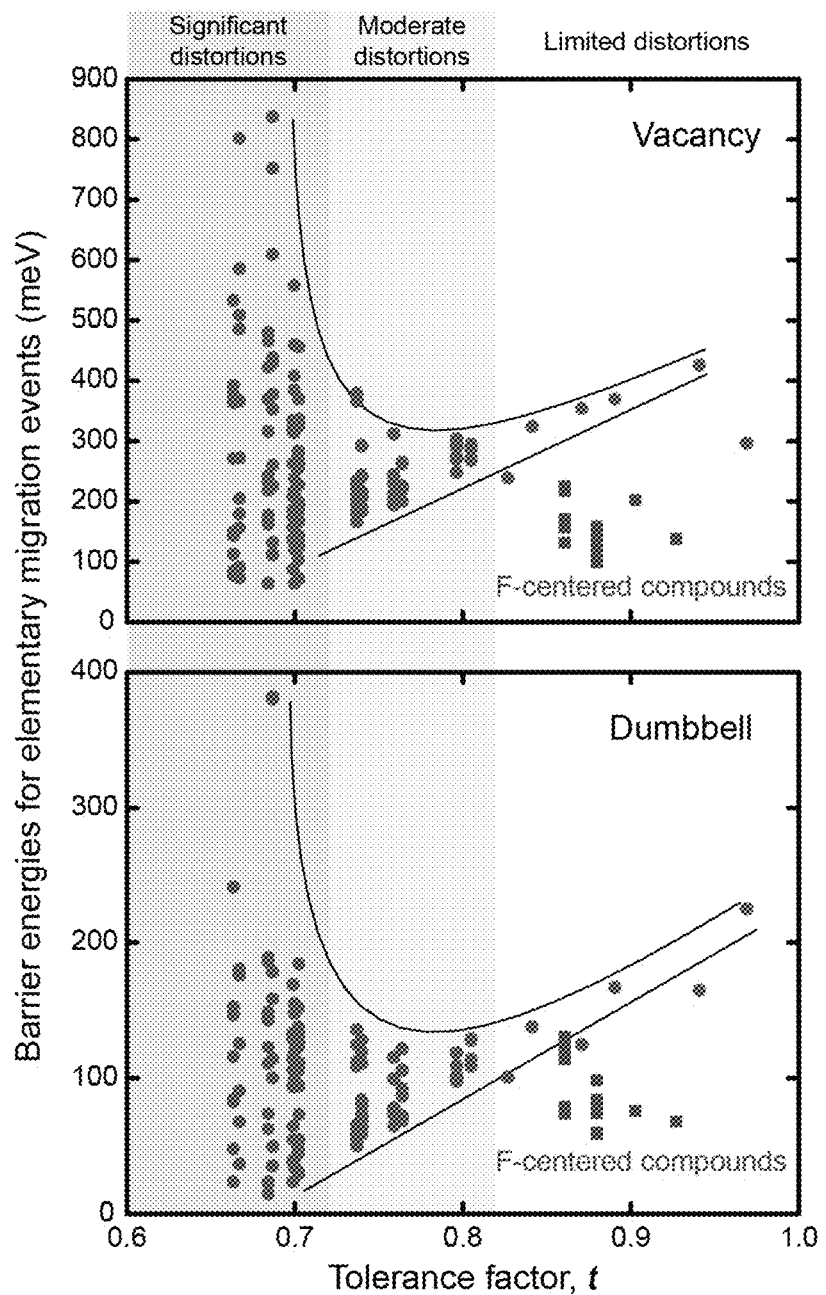
FIG. 9 depicts a graph showing the dispersion of elementary migration barriers as a function of the tolerance factor, t, for 24 anti-perovskite solid electrolytes.
Figure 10:
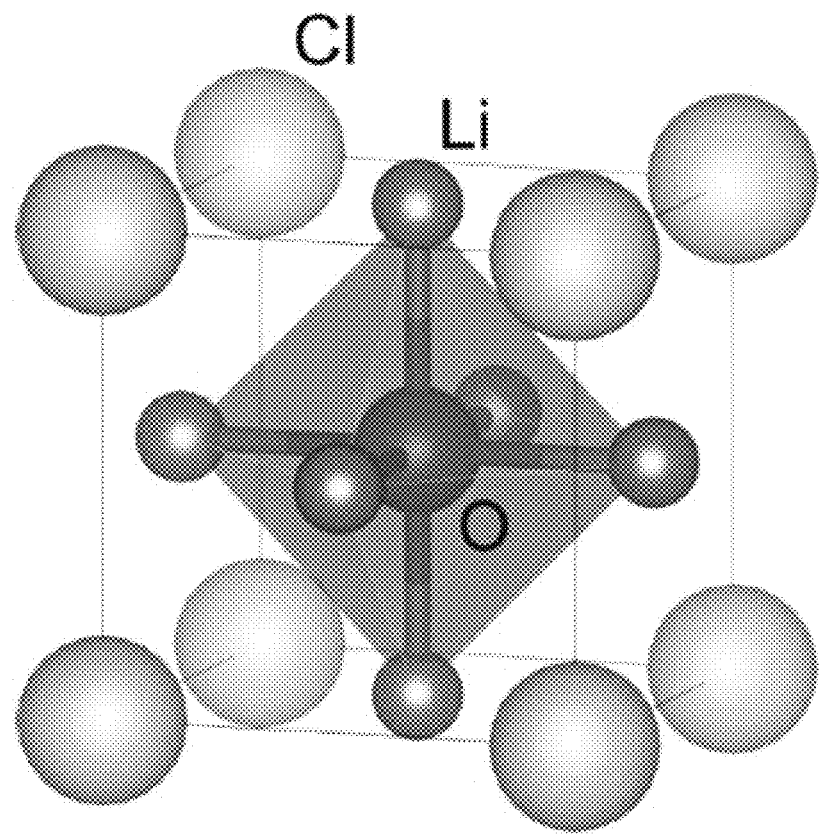
FIG. 10 depicts a unit cell of anti-perovskite $Li_3OCl$ in the cubic Pm-3m structure. Cl ions form the cubic framework and enclose a $Li_6O$ octahedron.

FIG. 9 plots the distribution of the energy barriers for all elementary migration paths as a function of the degree of lattice distortion, as measured by the tolerance factor. The barriers are obtained by averaging forward and backward hops. As described above, in the cubic Pm-3m systems all elementary paths are equivalent, and are therefore described by a single barrier. This degeneracy is broken in the non-cubic compounds, resulting in a widening distribution of energy barriers with increasing distortions, or equivalently, decreasing t. Taking vacancy migration as an example, compounds with moderate tolerance factors, t~0.8, exhibit a relatively narrow range (<100 meV) of barrier energies. This range increases rapidly with decreasing t, reaching a spread of ~900 meV for compounds having the smallest tolerance factors. Our results generalize the findings of an earlier study on $Li_3OCl_{0.5}Br_{0.5}$, which found that Cl—Br substitutional disorder results in a spectrum of activation barriers. In addition, the largest and smallest barriers vary distinctly with respect to t: the smallest barriers shrink in roughly linear proportion to t, while the largest barriers grow superlinearly. Thus, an increase in lattice distortions facilitates migration along some elementary pathways, while slowing others. If these lower-barrier hops can be connected in a percolating network, as shown in FIG. 6, then ionic mobility can increase.

In cases where the distribution of elementary energy barriers is known, percolation theory (PT) can be used to estimate the effective energy barrier, $E_p$, needed to establish a percolating network for ion migration. $E_p$ is defined in terms of the probability distribution of elementary energy barriers, F(E), and the bond percolation threshold, p: $p=\int_0^{E_p} F(E)dE$. Thus, $E_p$ is the smallest energy such that at least a fraction p of elementary barriers are less than $E_p$. In other words, the most likely migration paths will be those from F(E) having the lowest barriers; p determines how 'high' one must climb into F(E) to achieve percolation, with $E_p$ being the value of F(E) at the $p^{th}$ percentile. $E_p$ is expected to be similar to the limiting barriers evaluated here for APs; nevertheless, we are unaware of a direct comparison between PT and the 'brute force' enumeration approach used in the present study to evaluate limiting barriers. In the APs the full distribution of elementary barriers can be evaluated, FIG. 9. Thus, the AP systems present an opportunity to directly compare the predictions of PT with the limiting barriers described above.

Figure 18:
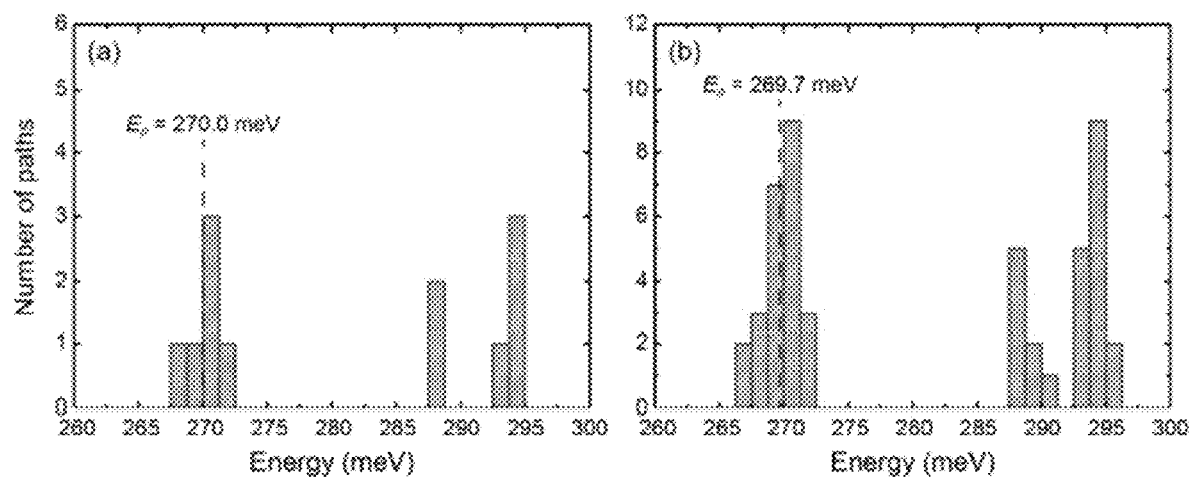
FIG. 18 depicts histograms of the elementary barrier energies for vacancy migration in $Li_3SI$. (a) 12 barriers that orbit a single octahedron. Using the bond percolation threshold p=0.18, the values fork and d are 2 and 0.36, respectively. The effective energy barrier $E_p$=270.0 meV. (b) Histogram constructed from 48 barriers from all four distinct octahedra in $Li_3SI$. In this case $E_p$=269.7 meV. Thus, mapping of hopping barriers on a single octahedron yields very similar results to that from a more comprehensive sampling of multiple octahedra.
Figure 19:
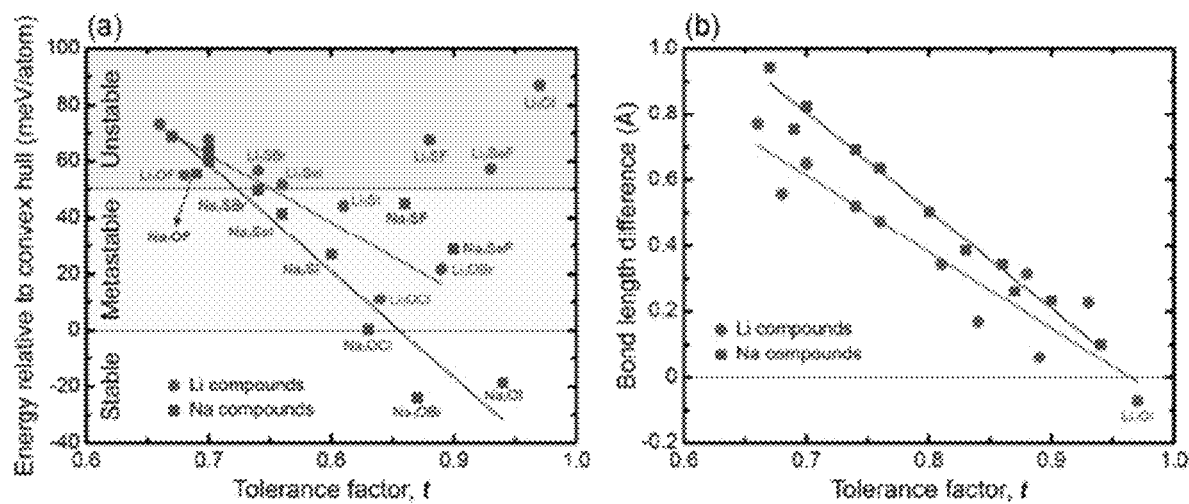
FIG. 19 depicts a graph in (a) showing correlation between the tolerance factor and the energy relative to the convex hull (equivalent to the decomposition energy, $E_d$) for the anti-perovskites examined in this study. (The Pearson correlation coefficients are −0.91 and −0.96 for Li and Na compounds, respectively. The outlier $Li_3OI$ and F-centered compounds were excluded from this correlation analysis.).

Application of PT requires an estimate of the bond percolation threshold, p. The product of p and the coordination number, CN, of a mobile ion (Na or Li) gives the average number of escape paths from a lattice site needed to establish a percolating network. Systems having lower CN (equivalent to fewer potential migration pathways) generally require larger p values to achieve percolation. Accurate p values have been proposed for several lattices. The Li—Li and Na-Na CN's for the majority of APs examined here is equal to 8, with a slightly larger value of 8.67 measured for compounds with smaller t. These CN's are similar to that of a body-centered cubic (BCC) lattice; thus, the percolation threshold for bcc systems, p=0.18, is adopted. The effective barrier can then be obtained by linear interpolation to the probability distribution of barriers as: $E_p=E_b^k+d(E_b^{k+1}-E_b^k)$. Here, $E_b^k$ is the energy of the $k^{th}$ lowest barrier, k is an integer, and d is a fraction between zero and one, defined by: p(N+1)=k+d. N is the number of elementary barriers in F(E). Additional details regarding the PT analysis are shown in FIG. 18. In all cases, good agreement is obtained: for example, the mean absolute deviation between these two estimates is only 10 meV. In total, the good agreement between the enumeration and PT predictions provides additional validation for our results.

While our emphasis thus far has been on clarifying the connection between lattice distortion and ionic mobility, the linkage between mobility and thermodynamic stability is also of fundamental interest. Moreover, the observation that several of the compounds examined exhibit low limiting barriers raises the question: can these materials be made? To answer, the thermodynamic stability of the APs was assessed using the convex hull concept. More specifically, the decomposition energy, $E_d$, of each AP at zero Kelvin was calculated assuming decomposition into a two-component mixture of alkali chalcogenides and halides. The APs were grouped into three categories based on their decomposition energies: (i.) Stable, $E_d<0$, (ii.) Metastable, $E_d$ within 0-50 meV/atom, and unstable, $E_d>50$ meV/atom. The decomposition energy for each AP as a function of its tolerance factor was plotted. As expected, the data show a rough correlation between stability and t: compounds having a higher degree of lattice distortion (smaller t) tend to be less stable. We recall from the preceding discussion that larger limiting barriers correlate with larger t (less distortion). Thus, a tradeoff exists between ionic mobility and stability: increasing distortion enhances mobility, but comes at a cost to stability. While it is unlikely a compound such as $Li_3SeCl$ with a very low limiting barrier (48 meV) would be stable ($E_d=73$ meV/atom), compounds that balance stability with the barrier height could be promising. Na3SI represents one such 'Goldilocks' material: it possesses both a moderate decomposition energy of 27 meV/atom and small limiting barrier heights of 99 and 270 meV for the interstitial and vacancy mechanisms, respectively, FIG. 7. Notably, $E_d$ for $Na_3SI$ is similar to that of $Li_3OBr$ (22 meV/atom, FIG. 20), a compound which has been experimentally synthesized, yet whose barriers are up to 100 meV larger. Consequently, $Na_3SI$ is proposed as a target for continued study.

Figure 22:
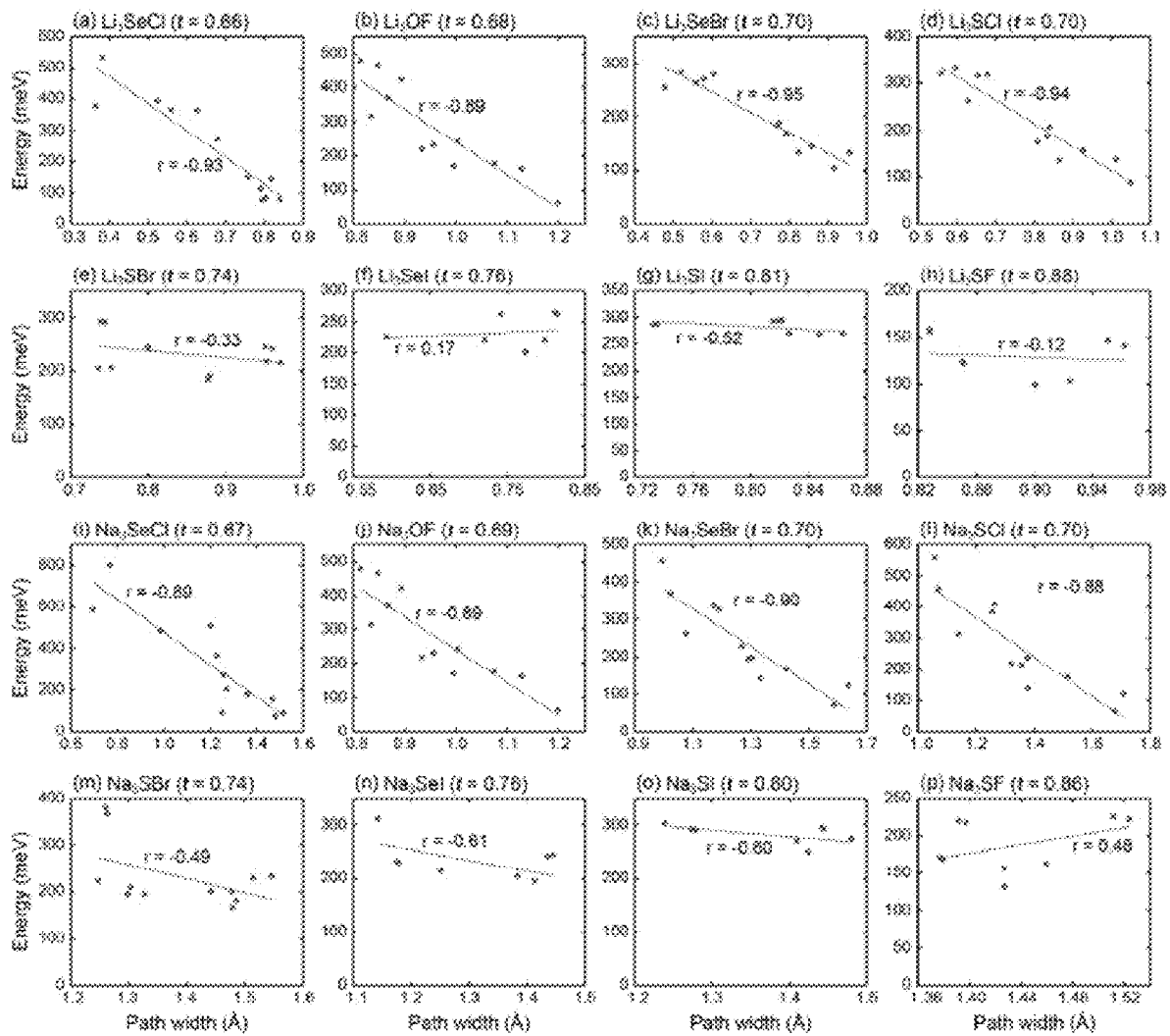
FIG. 22 depicts graphs showing the correlation between path width and elementary barrier energies for vacancy migration in the distorted (a)-(h) lithium and (i)-(p) sodium anti-perovskites. The r values represent Pearson correlation coefficients. The Goldschmidt tolerance factor, t, is also given for each compound; graphs are ordered based on t.
Figure 23:
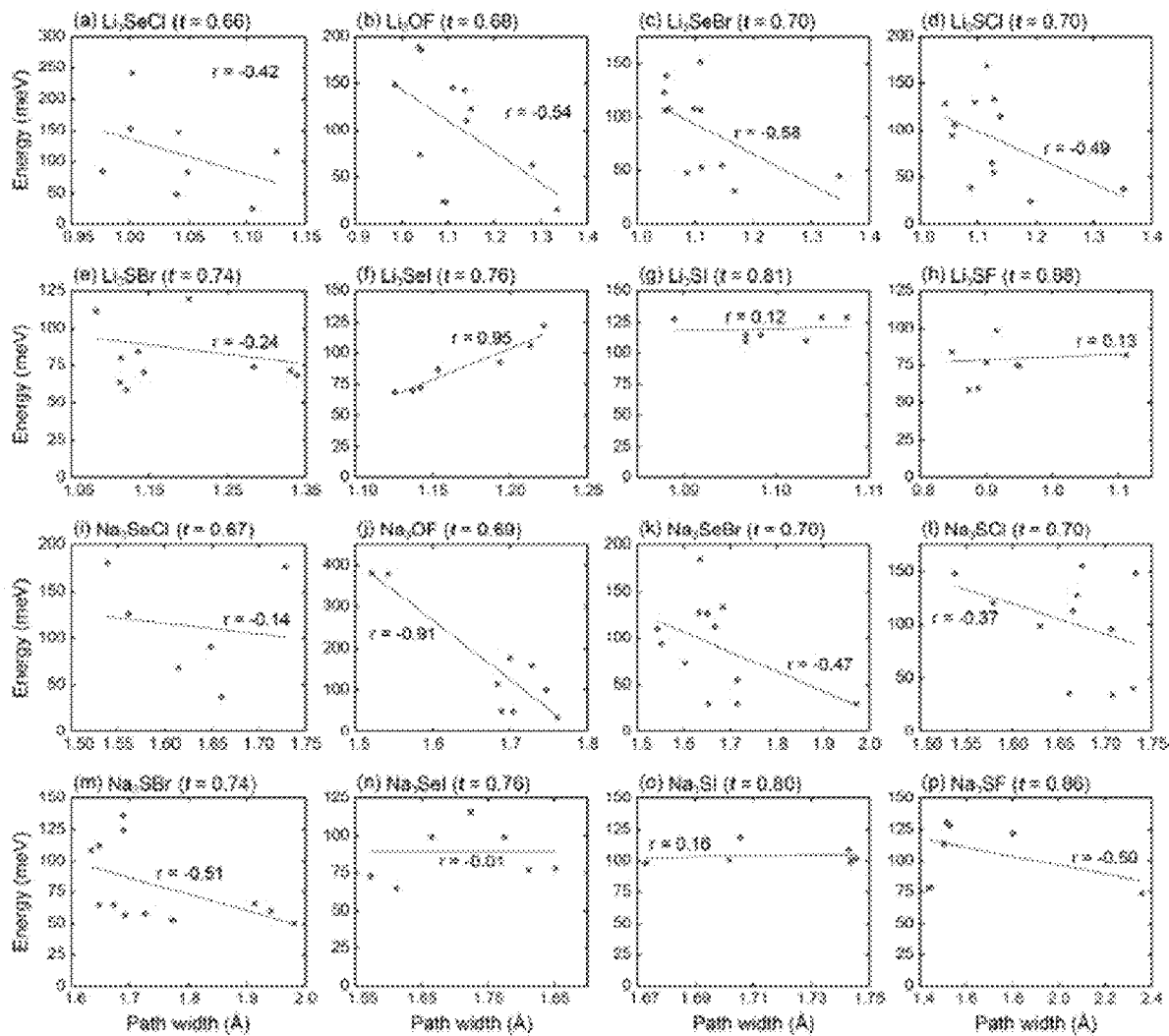
FIG. 23 depicts graphs showing the correlation between path width and elementary barrier energies for interstitial dumbbell migration in the distorted (a)-(h) lithium and (i)-(p) sodium anti-perovskites. The r values represent Pearson correlation coefficients. The Goldschmidt tolerance factor, t, is also given for each compound.

Our study indicates that increasing lattice distortion correlates with increasing ion mobility. A discussion of the mechanisms underlying these correlations is now presented. The migration barrier for an ion hop, $E_b$, is defined as the difference in energy at the transition state (TS) and the equilibrium state (ES): $E_b=E_{TS}-E_{ES}$. Thus, $E_b$ can be impacted by changes to TS, to ES, or to both. Turning first to factors associated with the TS, earlier studies have shown that increasing the width of the cation migration channel can lower $E_b$ by lowering $E_{TS}$. The correlation between $E_b$ for elementary hops and the width of the ion migration channel, for the vacancy and interstitial mechanisms, was plotted and observed in FIGS. 22 and 23. For the vacancy mechanism, our data showed that in most compounds a wider channel width results in smaller $E_b$. This correlation is much weaker for the interstitial mechanism (FIG. 23), most likely because the path-widening effects are subsumed within the formation enthalpy of the interstitial. Thus, lattice distortion influences $E_{TS}$ (and thus $E_b$) for the vacancy mechanism by introducing migration pathways with wider channels.

Figure 21:
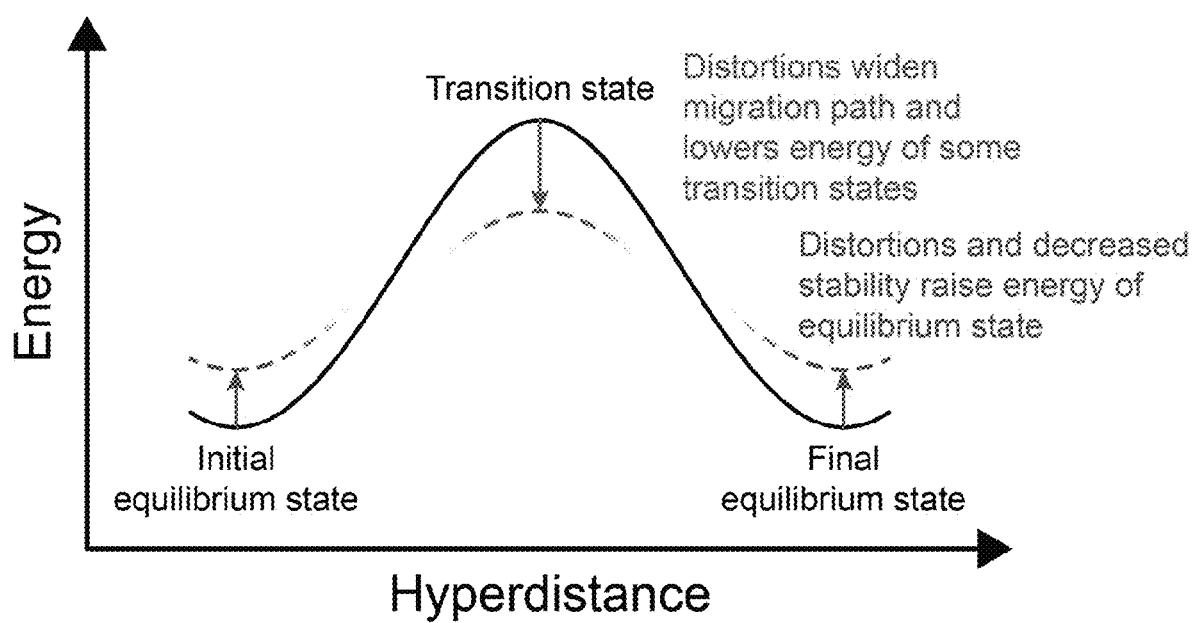
FIG. 21 depicts a graph showing the effects of lattice distortion on the energy barrier for ion migration in anti-perovskites. The black curve depicts the energy profile for migration in an undistorted cubic system. Red and blue dashed curves indicate the impact of distortion on the energy of the transition state and equilibrium states, respectively. Distortion can raise or lower the energy of the transition state, depending on whether the migration channel width is increased or decreased. As lattice distortions can result in a reduction to stability, increasing distortion can increase the energy of the equilibrium states.

Regarding the impact of distortion on the equilibrium state, experimental results showed that compounds with lower limiting barriers are less thermodynamically stable due to their greater degree of distortion. As stability is related to $E_{ES}$; this suggests that—other factors being equal—$E_{ES}$ will increase as stability decreases, thereby lowering $E_b$. Thus, the effect of larger distortions is to reduce the depth of the 'troughs' on the potential energy surface (FIG. 21), resulting in shallower energy corrugations for ion hopping.

The design of new solid electrolytes will be aided by an understanding of the elementary chemical and structural features that control ionic conductivity. The present study demonstrates that lattice distortion is one such feature. The connection between ionic mobility and lattice distortion was assessed across a series of 24 model anti-perovskite solid electrolytes. The degree of distortion, quantified by the tolerance factor, t, was systematically varied through a sequence of isovalent substitutions. Density functional theory calculations were used to evaluate the energy barriers for all relevant ion migration pathways, assuming both vacancy and interstitial mechanisms.

These calculations reveal a strong correlation between the degree of lattice distortion and the limiting barrier for percolating ion migration: compounds with larger distortion exhibit smaller migration barriers. This trend was confirmed by a percolation theory analysis based on the coordination of cation sites and the distribution of elementary energy barriers. The energetic spread between the largest and smallest migration barriers for a given compound was found to increase with increasing distortions. Hence, lattice distortions slow migration along some pathways, while speeding up others. In the case of the anti-perovskites, these lower-barrier hops can be assembled into a percolating network. Fast pathways result from a combination of channel widening and destabilization of the equilibrium configuration.

In addition, a higher degree of lattice distortion also correlates with diminished thermodynamic stability. Therefore, realizing those compounds having the highest ionic mobility in this class of conductors will require balancing a tradeoff with stability. $Na_3SI$ is identified as one such 'balanced' material.

While the anti-perovskites represent a specific model system, we anticipate that the trends described here can be generalized to other classes of crystalline solid electrolytes. The present results teach us that perturbations to ion-packing, introduced via isovalent substitution, lead to lattice distortions and symmetry-breaking. These effects remove the degeneracy of the migration barriers in the non-distorted materials, and can open up ion-migration channels with potentially lower barriers. In principle, this concept could be applied to other crystalline systems beyond the anti-perovskites.

The emergence of solid electrolytes with ionic conductivities comparable to that of liquids has radically improved the prospects for realizing all-solid-state batteries. Although a small number of ionically-conducting solids are now known, most exhibit shortcomings such as limited interfacial stability and susceptibility to 'dendrite' penetration. Consequently, the discovery of alternative solid electrolytes remains an important goal. This search has been slowed, however, by incomplete understanding of the elementary chemical and structural features that give rise to high ionic mobility. Herein we revealed the atomic-scale connections between mobility, thermodynamic stability, and lattice distortion across a series of model antiperovskite ion conductors. The degree of distortion was systematically tuned via isovalent composition variation. Increasing distortion is observed to correlate strongly with lower energy barriers for percolating ion migration: distortion suppresses corrugations of the potential energy surface by widening a subset of migration channels and by destabilizing equilibrium configurations. As greater distortion also coincides with reduced stability, realizing high ionic mobility in this class of conductors requires balancing a tradeoff with stability. $Na_3SI$ is identified as one such 'balanced' material.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method of manufacturing a solid-state electrolyte to be used in an electrochemical cell, the method comprising:
   forming a solid-state electrolyte from a material having a compositional property and a structural property, the material having been selected by:
   (i) providing material properties of the material, wherein the material properties comprise both compositional and structural information;
   (ii) calculating a first distortion parameter of the material, wherein the first distortion parameter represents the degree of lattice distortion of the material;
   (iii) determining an estimated ionic mobility value of the material using the first distortion parameter;
   (iv) varying the provided material properties using isovalent substitution and determining a second ionic mobility value from a second distortion parameter by repeating steps (i)-(iii); and
   (v) comparing the first and second ionic mobility values to select the superior material derivative.

2. The method of claim 1, wherein the material is selected from the group consisting of anti-perovskite solid electrolytes.

3. The method of claim 1, wherein the material has an anti-perovskite crystalline structure.

4. The method of claim 1, wherein the material has the formula $X_3AB$ where:
   X is a mono-valent cation with an electrical charge of +1;
   A is an anion with an electrical charge of −2; and
   B is an anion with an electrical charge of −1.

5. The method of claim 4, wherein X is selected from the group consisting of Li, Na, and K.

6. The method of claim 4, wherein A is selected from the group consisting of O, S, and Se.

7. The method of claim 4, wherein B is selected from the group consisting of F, Cl, Br, and I.

8. The method of claim 1, wherein the one or more distortion parameters of a material are calculated using atomic radii.

9. The method of claim 1, wherein the estimated ionic mobility value is determined using at least one additional parameter.

10. The method of claim 9, wherein the additional parameter is a known ionic mobility value of the material without distortions.

11. The method of claim 1, further comprising calculating a first and second estimated thermodynamic stability value.

12. The method of claim 11, wherein both the ionic mobility values and the thermodynamic stability values are compared to select the superior material derivative.

13. The method of claim 1, wherein step (iv) is repeated N times in order to determine N number of ionic mobilities for N material derivatives which are compared to select the superior material derivative.

14. The method of claim 1, wherein the superior material derivative has the highest ionic mobility values.

15. A method of manufacturing a solid-state electrolyte to be used in an electrochemical cell, the method comprising:
   forming a solid-state electrolyte from a material having a compositional property and a structural property, the material having been selected by:
   (i) calculating one or more distortion parameters of the material, wherein the distortion parameters represent the degree of lattice distortion of the material;
   (ii) estimating an ionic mobility value of the material using the one or more distortion parameters; and
   (iii) comparing the estimated ionic mobility value to a predetermined ionic mobility value to determine if the material should be selected.

16. The method of claim 15, wherein the material is selected from the group consisting of anti-perovskite solid electrolytes.

17. The method of claim 15, wherein the material has the formula $X_3AB$ wherein:
   X is a mono-valent cation with an electrical charge of +1;
   A is an anion with an electrical charge of −2;
   B is an anion with an electrical charge of −1
   X is selected from the group consisting of Li, Na, and K;
   A is selected from the group consisting of O, S, and Se; and
   B is selected from the group consisting of F, Cl, Br, and I.

18. The method of claim 15, wherein the one or more distortion parameters of a material are calculated using atomic radii.

19. The method of claim 15, wherein the estimated ionic mobility value is determined using a known ionic mobility value of the material without distortions.

20. The method of claim 15, wherein the material is selected if the estimated ionic mobility value is higher than the predetermined ionic mobility value.

21. A solid-state electrolyte, the solid-state electrolyte comprising:
   a material formed from $Na_3SI$,
   wherein the material has an anti-perovskite crystalline structure, and
   wherein the material has an energy barrier for an ion migration pathway for an interstitial mechanism of 24-165 meV.

22. The solid-state electrolyte of claim 21, wherein the energy barrier for the ion migration pathway for the interstitial mechanism is 99 meV.

23. The solid-state electrolyte of claim 21, wherein the material has—an energy barrier for an ion migration pathway for a vacancy mechanism of 95-426 meV.

24. A solid-state electrolyte, the solid-state electrolyte comprising:
   a material formed from $Na_3SI$,
   wherein the material has an anti-perovskite crystalline structure, and
   wherein the material has an energy barrier for an ion migration pathway for a vacancy mechanism of 95-426 meV.

25. The solid-state electrolyte of claim 24, wherein the energy barrier for the ion migration pathway for the vacancy mechanism is 270 meV.

26. The solid-state electrolyte of claim 25, wherein an energy barrier for an ion migration pathway for an interstitial mechanism is 99 meV.

* * * * *

UNITED STATES PATENT AND TRADEMARK OFFICE
CERTIFICATE OF CORRECTION

PATENT NO. : 11,482,732 B2
APPLICATION NO. : 16/585185
DATED : October 25, 2022
INVENTOR(S) : Donald J. Siegel et al.

It is certified that error appears in the above-identified patent and that said Letters Patent is hereby corrected as shown below:

In the Specification

Column 6, Line 18, "fork" should be --for k--.

Column 11, Line 54, "$Li_3Cl_{0.5}Br_{0.5}$" should be --$Li_3OCl_{0.5}Br_{0.5}$--.

Column 19, Line 8, "and unstable" should be --and (iii.) unstable--.

Signed and Sealed this
Twenty-fourth Day of January, 2023

Katherine Kelly Vidal
*Director of the United States Patent and Trademark Office*